United States Patent
Gütle et al.

(10) Patent No.: US 11,761,876 B2
(45) Date of Patent: Sep. 19, 2023

(54) INTEGRATED PARTICULATE MATTER SENSOR WITH CAVITY

(71) Applicant: Sensirion AG, Stäfa (CH)

(72) Inventors: Frank Gütle, Stäfa (CH); Lukas Hoppenau, Stäfa (CH); Lukas Rüthemann, Stäfa (CH); David Pustan, Stäfa (CH); Werner Hunziker, Stäfa (CH)

(73) Assignee: Sensirion AG, Stäfa (CH)

( * ) Notice: Subject to any disclaimer, the term of this patent is extended or adjusted under 35 U.S.C. 154(b) by 0 days.

(21) Appl. No.: 17/971,021

(22) Filed: Oct. 21, 2022

(65) Prior Publication Data

US 2023/0080848 A1 Mar. 16, 2023

Related U.S. Application Data

(63) Continuation of application No. PCT/EP2020/082129, filed on Nov. 13, 2020.

(30) Foreign Application Priority Data

Apr. 23, 2020 (EP) .................................... 20171192

(51) Int. Cl.
*G01N 15/06* (2006.01)

(52) U.S. Cl.
CPC ..... *G01N 15/06* (2013.01); *G01N 2015/0693* (2013.01)

(58) Field of Classification Search
CPC .................. G01N 15/06; G01N 2015/0693
See application file for complete search history.

(56) References Cited

U.S. PATENT DOCUMENTS 5,332,892 A * 7/1994 Li ...................... G06K 7/10623
 235/462.49
5,963,336 A * 10/1999 McAndrew ............ G01N 21/39
 216/60

(Continued)

FOREIGN PATENT DOCUMENTS

CN 106483051 B 7/2019
EP 3225977 A1 10/2017

(Continued)

OTHER PUBLICATIONS

Dai et al., "Fabrication of Diffractive Optical Elements Using the CMOS Process", Institute of Physics Publishing, 2002, 6 pages.

(Continued)

*Primary Examiner* — Dominic J Bologna
*Assistant Examiner* — Jarreas C Underwood
(74) *Attorney, Agent, or Firm* — Davis Wright Tremaine LLP; Gregory Rosenthal

(57) ABSTRACT

A particulate matter (PM) sensor comprises a substrate forming a cavity (5), the substrate comprising a semiconductor chip (4), and a light source (1) arranged in the cavity (5). The light source (1) is adapted to emit a light beam (7). The light beam (7) forms a detection volume (8) for particulate matter (9) outside the cavity (5). Optionally, the particulate matter sensor comprises an optical element (2) delimiting the cavity (5) at one end. The optical element (2) is configured to shape the light beam (7). Further, the particulate matter sensor comprises at least one photodetector (3) that is integrated into a surface of the semiconductor chip (4). The surface into which the at least one photodetector (3) is integrated faces the detection volume (8). The at least one photodetector (3) is adapted to detect light (10) scattered by particulate matter (9) in the detection volume (8).

30 Claims, 13 Drawing Sheets

(56) References Cited

U.S. PATENT DOCUMENTS

| | | | |
|---|---|---|---|
| 11,513,050 B2* | 11/2022 | Bergmann | G01N 1/2273 |
| 2002/0004204 A1* | 1/2002 | O'Keefe | C12Q 1/6825 |
| | | | 435/6.17 |
| 2006/0016995 A1* | 1/2006 | Kummer | G01N 21/3504 |
| | | | 257/E31.118 |
| 2009/0289266 A1* | 11/2009 | Lee | H01L 31/173 |
| | | | 257/E33.069 |
| 2015/0153275 A1* | 6/2015 | Park | G01N 33/0027 |
| | | | 356/336 |
| 2016/0025628 A1* | 1/2016 | Kim | G01N 33/004 |
| | | | 356/72 |
| 2018/0097139 A1* | 4/2018 | Li | H01L 25/041 |
| 2018/0335347 A1* | 11/2018 | Herrmann | G01J 5/045 |
| 2019/0049355 A1* | 2/2019 | Enenkel | G01N 15/06 |
| 2019/0346360 A1 | 11/2019 | Jutte et al. | |
| 2020/0056981 A1* | 2/2020 | Van Der Lee | G01N 15/1459 |
| 2020/0096310 A1 | 3/2020 | Mutlu et al. | |
| 2020/0103334 A1 | 4/2020 | Santangelo et al. | |
| 2020/0348544 A1* | 11/2020 | Levy | G02F 1/0121 |
| 2021/0199555 A1* | 7/2021 | Bergmann | G01N 15/0625 |
| 2022/0165893 A1* | 5/2022 | Hinds | H01L 31/02327 |

FOREIGN PATENT DOCUMENTS

| | | |
|---|---|---|
| EP | 3588057 A1 | 1/2020 |
| GB | 2448161 A | 10/2008 |
| WO | 2018100209 A2 | 6/2018 |
| WO | 2019115694 A1 | 6/2019 |

OTHER PUBLICATIONS

International Search Report and Written Opinion dated Nov. 2, 2021, Patent Application No. PCT/EP2020/082129, 10 pages.

* cited by examiner

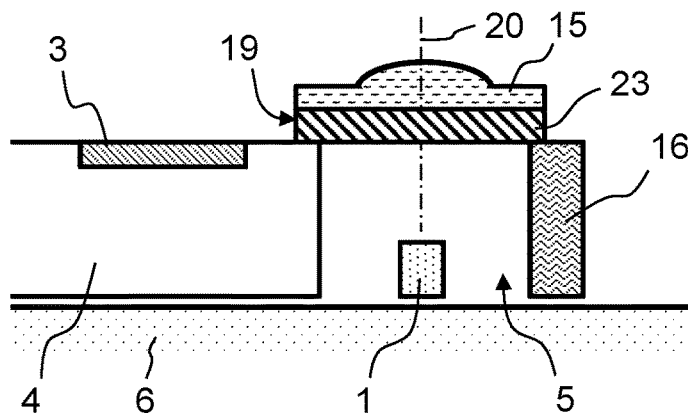
FIG. 10
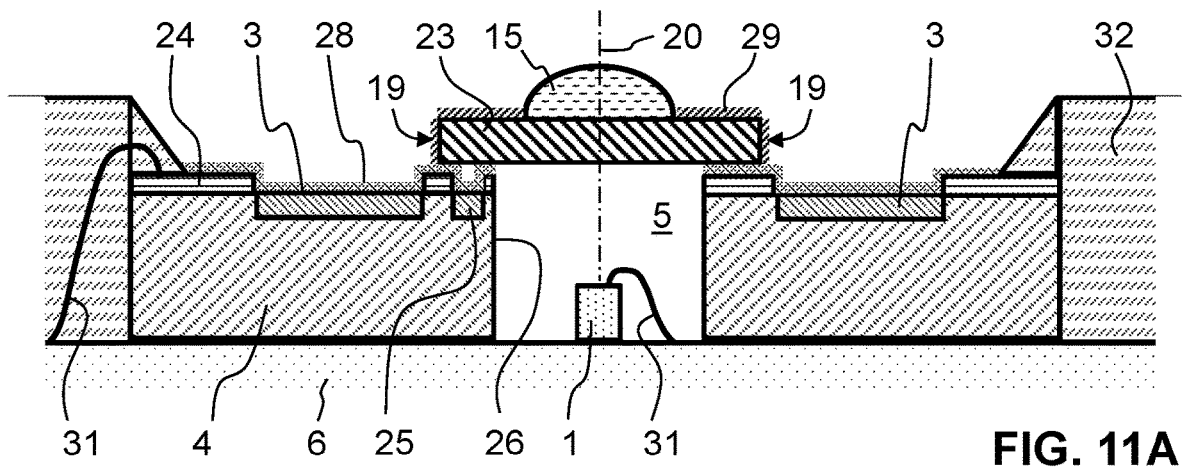
FIG. 11A
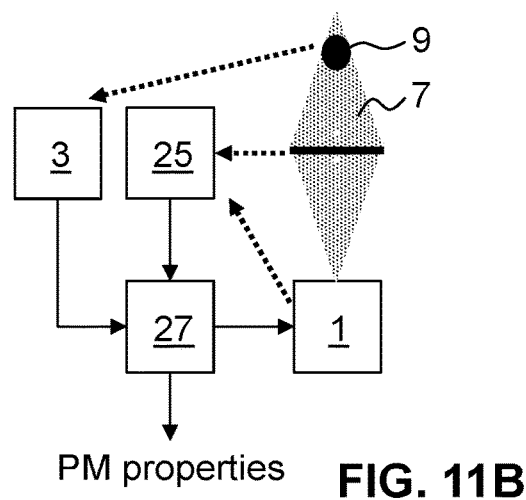
PM properties    FIG. 11B

INTEGRATED PARTICULATE MATTER SENSOR WITH CAVITY

CROSS REFERENCE TO RELATED APPLICATIONS

This application is a continuation of International Patent Application No. PCT/EP2020/082129, filed Nov. 13, 2020, entitled "INTEGRATED PARTICULATE MATTER SENSOR WITH CAVITY," which claims priority to European Patent Application No. 20171192.6, filed Apr. 23, 2020, the disclosures of which are incorporated herein by reference in their entireties.

TECHNICAL FIELD

The invention relates to a particulate matter sensor and to a particulate matter sensor module comprising the particulate matter sensor.

BACKGROUND

Particulate matter (PM) refers to solid particles and/or liquid droplets in a fluid. PM may pose a health risk, e.g., when inhaled, or cause bad visibility called haze. Typical categories of PM are PM10 and PM2.5, i.e., particles with diameters of 10 µm and 2.5 µm, respectively, and smaller.

Conventional PM sensor modules comprise a light source emitting light into a detection volume and a light detector detecting light scattered by particulate matter in the detection volume. Conventional PM sensor modules are built from discrete components, i.e., light source assemblies with laser diodes, optical elements, photodetectors, printed circuit boards (PCB), discrete amplifiers, microprocessors, and housings, etc. Air flow for sampling of particles is generated using a fan or alternatively a heater element. Examples are disclosed, e.g., in WO2018100209A2.

Such PM sensor modules are of macroscopic scale, i.e., having a dimension in the order of several centimeters. A reason for the form factor and size of conventional PM sensor modules is the discrete nature of used optoelectronic components, i.e., laser diode, optical element, mounting aid and photodetector.

US20150153275A1 discloses a PM sensor that comprises a light source and a light detector disposed adjacent to each other in a body portion. The light source emits light toward air that has been introduced into the body portion. An optical lens disposed on the light source focuses the emitted light. Scattered light is detected by the light detector.

US20160025628A1 discloses a mobile device configured to sense particulate matter. A sensor in the mobile device comprises a light emitter and a light receiver arranged at an angle.

CN106483051B discloses a mobile device for measuring the concentration of particulate matter. Light is emitted by a flash of the mobile device. Backscattered light is collected by a collecting lens, filtered, and detected by a light detector.

A problem to be solved by embodiments of the present invention is to provide a small PM sensor, which in particular yields reliable high-quality measurements.

SUMMARY

Accordingly, a particulate matter sensor is provided, comprising:

a substrate comprising a semiconductor chip, the substrate forming a cavity, at least a portion of the cavity being formed in the semiconductor chip;

at least one photodetector integrated into a surface of the semiconductor chip; and a light source arranged in the cavity, the light source being adapted to emit a light beam towards one end of the cavity (in the following called the "first" end), the light beam defining a detection volume for particulate matter outside the cavity, wherein the surface of the semiconductor chip into which the at least one photodetector is integrated faces the detection volume, and wherein the at least one photodetector is adapted to detect light scattered by particulate matter in the detection volume.

By providing a cavity that is at least partially formed in the very same semiconductor chip in which the at least one photodetector is integrated and arranging the light source in the cavity, a very compact PM sensor can be obtained.

The detection volume comprises a portion of the light beam in which the intensity of the light is sufficiently high to enable detection of light that has been scattered from PM in the light beam by the at least one photodetector. In particular, the detection volume may be defined as the volume for which PM present in this volume causes a clear (i.e., statistically significant) signal above the noise level in the PM sensor. As such, the detection volume depends on various factors such as a size of PM, an optical power of the light source, a geometry of the light beam, etc.

In some embodiments, the semiconductor chip comprises a CMOS layer stack. One or more layers of the CMOS layer stack may then form a membrane that spans the cavity at its first end. The thickness of the membrane may be less than 20 µm, in particular less than 10 µm. The membrane may thus protect the light source. In particular, the cavity may be completely closed at the first end by the membrane, rendering the cavity fluid-tight at its first end.

In some embodiments, the particulate matter sensor may comprise an optical element delimiting the cavity at the first end, the optical element being configured to shape the light beam to form the detection volume. In other embodiments, the optical element may be left away. For instance, the light source may itself be configured to create a sufficiently collimated or focused light beam that the light beam has sufficient intensity outside the cavity to form the detection volume. In some embodiments, the optical element includes a membrane formed by one or more layers of the CMOS layer stack. In other embodiments, the cavity is open at the first end, and the optical element is arranged on the open first end of the cavity.

The cavity is preferably open at a second end opposite to the first end. The light source is preferably arranged in the cavity at the second end of the cavity.

In some embodiments, the substrate may entirely be formed by the semiconductor chip, i.e., the substrate may consist of the semiconductor chip alone. In other embodiments, the substrate may comprise a spacer to which the semiconductor chip is bonded, as detailed further below.

If the substrate consists of the semiconductor chip alone, and if an optical element is present, the particulate matter sensor may have the following features:

a semiconductor chip, the semiconductor chip forming a cavity;

at least one photodetector integrated into a surface of the semiconductor chip;

a light source arranged in the cavity, the light source being adapted to emit a light beam, an optical element delimiting the cavity at one end (the "first" end);

wherein the light source is arranged to direct the light beam onto the optical element, wherein the optical element is configured to shape the light beam such that the light beam forms a detection volume for particulate matter outside the cavity, wherein the surface of the semiconductor chip into which the at least one photodetector is integrated faces the detection volume, and wherein the at least one photodetector is adapted to detect light scattered by particulate matter in the detection volume.

Advantageous embodiments of the PM sensor are explained in the following. The PM sensor generally comprises the following elements:

A substrate forming a cavity: The substrate comprises or consists of a semiconductor chip, advantageously a semiconductor chip comprising a complementary metal-oxide-semiconductor (CMOS) layer stack. Accordingly, the PM sensor function preferably is integrated into the semiconductor chip. The cavity has side walls formed by the substrate. At least a portion of each side wall is formed by the semiconductor chip. The cavity may essentially have the shape of a cuboid, e.g., with an edge length in the range between 0.3 mm and 1 mm, or may have the shape of a cylinder, e.g., with a diameter in the range between 0.3 mm and 1 mm. In other embodiments, the cavity may have the shape of a truncated cone or a truncated pyramid. In more general terms, each side wall of the cavity may have at least one inclined portion that is inclined relative to the optical axis or to a symmetry axis of the cavity. At least a portion of the cavity may e.g., be manufactured by etching the semiconductor chip, preferably from a bottom side of the substrate or alternative processing techniques. In some embodiments, the cavity may reach through an entire thickness of the semiconductor chip, while in other embodiments, the cavity may not reach through the entire thickness of the semiconductor chip but take the shape of a recess delimited by a remainder part of the semiconductor chip, typically by a membrane formed by one or more layers of the CMOS layer stack.

A light source adapted to emit a light beam. The light source is arranged in the cavity. In advantageous embodiments, the light source is a laser diode, for instance, a vertical-cavity surface-emitting laser (VCSEL). The term "light" is not meant to be restricted to visible light but rather to include as well at least ultraviolet and infrared light. In general, a wavelength of the emitted light is in the range of 500 nm to 1100 nm, in particular between 640 nm and 950 nm. The light source emits a light beam towards the first end of the cavity. It can be arranged at the second end of the cavity.

Optionally, an optical element delimiting the cavity at the first end: Typically, the optical element is arranged at the end of the cavity opposite to the light source. The light source is arranged in the cavity to direct the light beam onto the optical element, through at least a part of the cavity. The optical element is adapted to shape the light beam, thereby forming the detection volume. In an advantageous embodiment, the optical element focusses the light beam, as will be detailed further below.

At least one photodetector integrated in the substrate: The at least one photodetector is integrated into a surface of the semiconductor chip. The at least one photodetector may include at least one photodiode. It may be formed in the semiconductor chip by a CMOS process. The at least one photodetector faces the detection volume and is adapted to detect light scattered by PM in the detection volume. In particular, the at least one photodetector is arranged with a distance of at most 2 mm from the optical element (measured from edge to edge) and more particularly adjacent to the optical element. Moreover, it is advantageous that the optical element is, within a tolerance of +1 mm/−0.1 mm, arranged in a plane defined the at least one photodetector, to be more precise, in a plane defined by the surface of the semiconductor chip into which the at least one photodetector is integrated, as will be detailed further below.

Such PM sensor can be built with a small form factor, i.e., smaller than 7 mm×7 mm×2 mm, in particular smaller than 5 mm×5 mm×1.6 mm. Also, it can be integrated into a PM sensor module or a portable electronic device such as a smartphone or an internet-of-things (IoT) device. Moreover, such PM sensor has the advantage of having a low consumption of electrical current, which again makes it well suited for integration into battery-driven devices.

In some advantageous embodiments, the PM sensor further comprises:

a control unit electrically connected to the at least one photodetector: The control unit is adapted to receive signals from the at least one photodetector caused by light scattered by PM in the detection volume. Further, it is adapted to evaluate the signals in terms of a physical quantity related to the PM, i.e., to determine a physical quantity related to the particulate matter based on the signals. In particular, the physical quantity may comprise at least one of a number concentration, a size, and a size distribution of PM. Advantageously, at least part of the control unit may be integrated into the semiconductor chip. In particular, at least part of the control unit may be formed in the CMOS layer stack. More particularly, at least part of the control unit may be an ASIC that is formed in the CMOS layer stack. The control unit may be completely implemented in the semiconductor chip, or part of the control unit may be implemented separately from the semiconductor chip, e.g., in a separate signal processor or calculation unit.

Further advantageous technical features will become apparent from the description below. For the skilled person, it is evident that these features may be combined in various ways in order to form embodiments of the invention.

Light Source

An amount of light scattered by PM in the detection volume and received by the at least one photodetector depends, inter alia, on the optical power of the light source. Hence it is of interest to quantify the optical power. The following embodiments are particularly advantageous if the light source comprises a VCSEL since the optical power of VCSELs is usually not controlled because an exact optical power is irrelevant for applications like time-of-flight (TOF) measurements.

For quantifying the optical power of the light source, the PM sensor may comprise a photosensitive auxiliary detector that is arranged to receive light that has been emitted from the light source without having been scattered by PM. The auxiliary detector may be integrated into the semiconductor chip. It may be manufactured by the same technology as the at least one photodetector that is used to detect light scattered from PM. The auxiliary detector may in particular be a photodiode, in particular, a photodiode manufactured by a CMOS process. The auxiliary detector may have a surface area in the photodetector plane which is significantly smaller than the total surface area of the photodetectors used to detect light scattered from PM, for instance, not more than 1% of the latter surface area, thereby ensuring that the signal from the auxiliary detector is not significantly influenced by light that has been scattered by PM and minimizing sensitivity to environmental light.

If the auxiliary detector is integrated into the semiconductor chip, the chip including a CMOS layer stack, there are at least three different possible light paths between the light source and the auxiliary detector. A first light path extends through the semiconductor chip. While light may be strongly attenuated by semiconductors such as silicon, the penetration depth of the light is generally not negligibly small. If the auxiliary detector is arranged in the semiconductor chip sufficiently close to a wall of the cavity (e.g., at a lateral distance of not more than 200 μm), a sufficient amount of light may reach the auxiliary detector through the semiconductor chip. A second light path extends through the CMOS layer stack, which may act as a light guide. Stray light may in this way be laterally guided to the auxiliary detector. A third light path extends through the optical element if present. Stray light that has been scattered inside the optical element or at its surfaces may in this way reach the auxiliary detector. Depending on the design, one or more of these light paths may be active.

Accordingly, in a first embodiment, the auxiliary detector, in particular, a photodiode, is arranged adjacent to the optical element. In this manner, the auxiliary detector may receive stray light from the optical element. The auxiliary detector may be arranged in the cavity, e.g., on a wall of the cavity facing the optical element. By integrating the auxiliary detector into the semiconductor chip, the manufacturing process is simplified, e.g., in that the auxiliary photosensitive detector is formed during a regular CMOS processing.

The auxiliary detector is adapted to measure stray light from the optical element, i.e., light which does not leave the optical element towards the detection volume but is reflected or scattered into other directions, e.g., backwards. It has been found that an amount of stray light is indicative of, in particular proportional to, the optical power of the light source. Hence, the control unit is further electrically connected to the auxiliary detector and adapted to determine an optical power of the light source from the stray light and to evaluate the physical quantity related to the PM dependent on the determined optical power. Alternatively, or additionally, the control unit is adapted to control the light source dependent on the determined optical power.

In a second embodiment, the auxiliary detector, in particular, photodiode, is arranged in or adjacent to the cavity and adapted to measure spontaneous emission of the light source. This may be particularly relevant if the light source is a VCSEL. VCSELs have been found to exhibit spontaneous emission of light on one or more side walls, i.e., one or more walls other than a main emission surface of the VCSEL. Further, it has been found that an amount of spontaneous emission is, again, indicative of, in particular proportional to, the optical power of the light source. Hence, the control unit is further electrically connected to the photodiode and adapted to determine an optical power of the light source from the measured spontaneous emission and to evaluate the physical quantity related to the PM dependent on the determined optical power. Alternatively, or additionally, the control unit is adapted to control the light source dependent on the determined optical power. Again, the photodiode is advantageously integrated in the substrate.

The described embodiments facilitate more accurate measurements of the physical quantity related to the PM, in particular in case that the optical power of the light source is otherwise unknown, as e.g., with a VCSEL.

Optical Element

In general, the described PM sensor is optimized for a large detection volume, because the PM count is directly proportional to the detection volume as defined above. As explained above, a PM particle needs to generate enough scattered light in the direction of the at least one photodetector such that a signal from the scattered light detected by the at least one photodetector is above the noise level, e.g., dark current noise. The volume for which this condition is fulfilled is called the detection volume. The light scattered from PM may be approximately described by Mie theory. To explain the optimization of the detection volume, a further approximation may be helpful: Evidently, the detection volume is, inter alia, limited by geometrical effects, such as a spreading of light emitted by a point source or scattered by a particle. The spreading causes an intensity of the light to diminish with distance d from the point source or, respectively, the scattering particle as $1/d^2$, corresponding to a growing surface of an outgoing spherical wave. This has implications for the design of the PM sensor in general and of the optical element in particular.

The optical element will generally define an optical axis. The optical axis is preferably perpendicular to the surface of the semiconductor chip into which the at least one photodetector is integrated. In an advantageous embodiment, the optical element focusses the light beam, e.g., in a focus or a focus region. Accordingly, the intensity of the light beam increases along the optical axis with distance l from the optical element up to the focus as $l^2$, corresponding to the decreasing surface of a conical light beam. It can be seen that this effect of increasing intensity of light within the detection volume counteracts and, to a certain degree, balances the spreading effect of light scattered by PM particles as described above. In this way, the detection volume is maximized for a given light source and a given photodetector.

In particular, the detection volume accordingly ranges from the optical element at least to the focus of the light beam. A distance $l_0$ between the optical element and the focus may be at least 1 mm. In general, an optimum focus distance depends on a threshold value of the at least one photodetector for resolving particle scattered light against noise, and the optical power of the light source, and a numerical aperture of the optical element. Depending on the size of PM particles, the detection volume may even extend beyond the focus, e.g., to 1.2 or 1.5 times $l_0$ for large particles. In this way, the PM sensor is adapted to detect PM at least as far as 1.5 mm from the optical element.

As an alternative to focusing, the optical element may be adapted to collimate the light beam, i.e., to shape the light beam such that different rays within the light beam are essentially parallel outside the cavity. In this case, the light intensity theoretically remains constant along the light beam under the assumptions of no scattering and no attenuation. Also, such a setup with a collimating optical element instead of a focusing optical element can yield a large detection volume, e.g., up to 3 cm from the optical element.

Again, in view of a maximum size of the detection volume, it is advantageous that the optical element is situated in the same plane as the at least one photodetector (i.e., in the same plane as the surface of the semiconductor chip into which the at least one photodetector is integrated) or only slightly above or below as described before. Accordingly, the optical element may in one embodiment protrude from the plane of the at least one photodetector, or, in another embodiment, only slightly do so, e.g., by at maximum 0.6 mm. Also, it is advantageous that a thickness of the optical element perpendicular to the light beam is small, i.e., below 2 mm, in particular below 1 mm. In this way, a shadowing of the at least one photodetector from light scattered by PM particles near the optical element by the optical element can be prevented. In other words, the detection volume may be increased towards, or optimally up to, the optical element.

At the same time, it is advantageous that a height of the cavity, i.e., a distance between the light source and the optical element, is at least 0.25 mm, in particular at least 0.45 mm. This makes the PM sensor more robust against manufacturing errors such as slight deviations from optimal dimensions. Together with the above considerations concerning shadowing, this leads to the conclusion that the thickness of the optical element should advantageously be small.

In some embodiments, the substrate is arranged on top of a base substrate, which may e.g., be a carrier made from glass, semiconductor, ceramics, etc. In such embodiments, the cavity may be delimited by the optical element at the one (first) end, and by the base substrate at the other (second) end. The light source may be arranged on the base substrate and emit light in direction to the optical element.

In general, the optical element may from a refractive optical element, in particular, a lens, or a diffractive optical element. A refractive optical element shapes the light beam by refraction, whereas a diffractive optical element shapes the light beam by diffraction. These principles may also be combined. In some embodiments, the optical element comprises an imprint polymer lens or an injection-molded lens.

In some embodiments, the optical element may comprise a glass carrier substrate and an optical structure, in particular, a polymer lens, formed on the glass carrier substrate. The optical structure may be formed, e.g., by imprinting a UV curable polymer with a stamp, followed by UV curing, or it may be formed by photolithography.

In a process for manufacturing an imprint lens, a polymer lens is formed on the glass carrier substrate. In particular multiple polymer lenses can be formed on the glass carrier substrate. The glass carrier substrate is then diced to form a single lens unit. The polymer lens together with the glass carrier substrate is then placed on the cavity.

In an embodiment, the glass carrier substrate has a thickness of less than 1000 µm, e.g., 800 µm, in particular less than 750 µm or less than 600 µm.

In other embodiments, the optical element comprises a membrane formed by one or more layers of the CMOS layer stack. An optical structure may be disposed on the membrane to form the optical element. In addition, or in the alternative, the membrane itself may comprise at least one structured CMOS layer to form the optical element. The membrane thus acts as a diffractive optical element, DOE. In particular, the membrane may act as a metamaterial that is transparent for the light beam, the metamaterial comprising structures effectively shaping the light beam. For generating such DOE, a membrane is manufactured from the substrate, e.g., in form of a thin layer, and e.g., by etching the substrate from a bottom side almost through an entire thickness of the substrate such that the membrane remains at the front side of the substrate covering the cavity. The structures for shaping the light beam may have been produced in a previous step during processing of the CMOS layer stack, or they can be produced in a subsequent step, e.g., by structuring the membrane e.g., by etching, or by applying the structures onto the membrane. Advantageously, a thickness of the membrane or metamaterial is less than 20 µm, in particular less than 10 µm.

In general, a thin optical element, as proposed in the embodiments above, enables minimum shadowing of scattered light, thus providing a large detection volume. In other words, a thin optical element facilitates a minimum required distance between the optical element and the at least one photodetector while preventing shadowing. Also, it facilitates a small overall form factor of the PM sensor.

Another aspect relating to the optical element concerns stray light leaving the optical element in other directions than the desired light beam, e.g., to the sides, in particular towards the at least one photodetector. If such stray light reaches the at least one photodetector, it significantly increases the noise level and thus decreases the signal-to-noise ratio of the PM sensor, hence effectively decreasing the detection volume.

In order to prevent stray light from the optical element, in particular in direction towards the at least one photodetector, the PM sensor advantageously comprises a light barrier between the optical element and the at least one photodetector.

In some embodiments, the light barrier comprises a blackening or silvering of side walls of the optical element facing the at least one photodetector. In particular, the blackening or silvering may comprise a selective coating only reacting with the carrier glass layer but not with the polymer lens described above. A prime example is the application of a mirroring layer by the well-known silver nitrate process. The term "silvering" is to be understood as a reflective coating serving as light barrier, but not necessarily consisting of silver. Other materials barring light from passing may be used.

In some embodiments, the light barrier comprises a diaphragm formed by a coating on the optical element, the diaphragm defining an aperture for the light beam. The diaphragm may be formed, e.g., by a chromium coating on a glass carrier substrate. In particular, for an imprint polymer lens on a glass carrier substrate, the diaphragm with the aperture may advantageously be placed on at least one of the top or bottom side of the glass carrier substrate.

Such light barrier allows to block stray light from reaching the at least one photodetector. At the same time, the light beam passes the optical beam unhindered. Also, stray light leaving the optical element towards the cavity may be kept largely unaffected, such that the above described method of quantifying the optical power of the light source remains feasible with such embodiments.

The present invention also provides an optical element having a light barrier as described herein, independently of whether or not the optical element is integrated into a PM sensor.

Photodetector

The following disclosure relating to the one or more photodetectors shall be considered to be disclosed in combination with the PM sensor, however, also outside the application in such PM sensor, i.e., independent from the PM sensor, rather as a photodetector device comprising a photodetector integrated into a semiconductor chip, which may include a CMOS metallization and dielectric layers at the top of the semiconductor chip.

While the at least one photodetector may be of any type of photodetector, it is advantageous that it is a silicon-based photodetector. Such photodetector may be manufactured in the same process steps, e.g., in CMOS process steps, as is preferably the control unit represented by electronic circuitry integrated into the preferred silicon substrate. Such photodetectors are simpler to handle during manufacturing and less costly than other semiconductor photodetectors. Thus, they are well suited for manufacturing large numbers of PM sensors, e.g., for IoT devices.

In an advantageous embodiment, the particulate matter sensor comprises a plurality of photodetectors integrated into the same surface of the semiconductor chip. The photodetectors may be arranged in an array, i.e., the multiple photodetectors may be arranged in a regular pattern. This is useful since it is desired that the at least one photodetector covers a large area, while at the same time minimizing the distance to the first end of the cavity, in particular, to the optical element if present. The photodetectors may be disposed at different locations around the cavity or optical element, preferably on diametrically opposite sides of the cavity or optical element, more preferably distributed over multiple locations along a circumference of the cavity or optical element. In particular, if the photodetectors are arranged in one or more arrays, the array or arrays may be distributed around the cavity or optical element. As an example, four photodetectors may be distributed in the same plane as the optical element.

Each photodetector may form a pixel. Preferably, the photodetector pixels each have a planar dimension of less than 1×1 mm$^2$, preferably less than 0.5×0.5 mm$^2$, and even more preferably less than 0.3×0.3 mm$^2$. The same square measures apply in case of non-square shaped pixels, such as circular shaped pixels.

In this way, a yield of light scattered by PM in the detection volume and hitting the photodetectors is maximized.

Also here, the geometrical considerations from above apply: The at least one photodetector should advantageously be as close as possible to the cavity or optical element. In this way, the optical path length from scattering particle within the detection volume to the at least one photodetector is minimized and thus the signal-to-noise ratio maximized.

Optionally, the PM sensor comprises an optical filter on the at least one photodetector. This means the optical filter covers a surface of the at least one photodetector opposite to the substrate. The optical filter may be disposed on the surface of the semiconductor chip in which the at least one photodetector is integrated. Advantageously, the optical filter filters out light and radiation outside a dominant wavelength band of the light source. In this way, a background rejection is achieved since spurious light or radiation events do not reach the at least one photodetector. The optical filter may be an interference filter, comprising a plurality of layers having different indices of refraction to cause destructive interference outside the desired wavelength band.

In an advantageous embodiment, the photodetectors are separated by an electrically conducting material, e.g., having the shape of a grid with the photodetectors being arranged in the vacancies of the grid, e.g., in form of tiles or pixels as already laid out above. In particular, the photodetectors may be separated by a metallization of the substrate. In this way, manufacturing the electrically conducting material may be integrated in the regular processing of the semiconductor chip, wherein a topmost metallization of the CMOS layer stack is manufactured such that it, and in particular its partitioning borders, serves as the electrically conducting material separating the photodetectors. Such electrically conducting material between the photodetectors may be grounded and thus acts as a Faraday cage and may be exposed towards the measuring volume. For enabling the electrically conducting material to be grounded, the electrically conducting material may be connected to a ground connector of the sensor device. In particular, the electrically conducting material is adapted to protect the photodetectors from electromagnetic interference, e.g., with other electronic devices in an environment of the PM sensor. The above ranges of the pixel dimensions accordingly define a distance between the metallizations and promote the shielding from electromagnetic interference.

For a further reduction of electromagnetic interference, it is advantageous that the at least one photodetector is partitioned into a first partition facing the detection volume and a second partition shielded from light scattered by PM in the detection volume. For instance, the at least one photodetector in the second partition may be covered by an opaque layer that is opaque at least in a wavelength range that contains the dominant wavelength of the light source. The opaque layer is preferably electrically insulating to ensure that both partitions are exposed to the same levels of electromagnetic interference. For instance, the opaque layer may be created by inkjet printing. The two separate partitions may be used to detect and cancel signals in the photodetectors that are due only to unwanted electromagnetic interference but not to light scattered by PM in the detection volume. For that purpose, the control unit is adapted to perform a differential measurement of the first partition and the second partition. In particular, spurious effects of electromagnetic interference with the first partition and the second partition of the at least one photodetector is thereby cancelled.

Further Aspects

As already mentioned above, the substrate may comprise a spacer. The semiconductor chip may be bonded to the spacer, in particular, at a back surface of the semiconductor chip, the back surface facing away from the surface into which the photodetectors are integrated. The cavity may be formed in both the spacer and the semiconductor chip. By using a spacer, the distance between the light source and the optical element can be increased. Increasing the distance between light source and optical element enables the use of an optical element with greater focal length. This may have several beneficial effects, in particular, on the size of the detection volume and on sensitivity to production tolerances.

As already mentioned, the PM sensor may comprise a base substrate. The light source may be mounted on the base substrate. The substrate may also be arranged on the base substrate, such that the light source is arranged in the cavity. If the substrate consists of a semiconductor chip, the semiconductor chip may be directly connected to the base substrate. If the substrate comprises a spacer, the spacer may be arranged between the base substrate and the semiconductor chip. The base substrate preferably extends in a plane that is parallel to the surface of the semiconductor chip in which the photodetectors are integrated. The base substrate may form or comprise a land grid array.

To reduce the amount of light that reaches the at least one photodetector from the light source through the side walls of the cavity, an opaque coating may be applied to the side walls of the cavity. Likewise, to reduce the effects of environmental light, an opaque coating may be applied to a back surface of the substrate or semiconductor chip, the back surface facing away from the surface in which the at least one photodetector is integrated. If the substrate comprises a semiconductor chip and a spacer, the opaque coating may be applied to the back side of the spacer, to the back side of the semiconductor chip, or to both. The opaque coating may comprise a metallization and/or a coating that has been applied by an inkjet process.

The cavity may have a symmetry axis. In particular, the cavity may have a discrete or continuous rotational symmetry about the symmetry axis. The symmetry axis is preferably perpendicular to the surface of the semiconductor chip in which the photodetectors are integrated. It is preferably parallel to the optical axis defined by the optical element. It may coincide with the optical axis.

The PM sensor may further comprise a light-blocking element, the light-blocking element being arranged on the surface of the semiconductor chip in which the photodetectors are integrated in such a manner that the light-blocking element selectively shields a portion of one or more of the photodetectors from light that has been scattered from a particulate matter particle in the detection volume, said portion depending on a distance of the particle from the surface of the semiconductor chip in which the at least one photodetector is integrated, while one or more other photodetectors are not shielded by the light-blocking element. The light-blocking element may be formed by an asymmetric extension of the optical element. The control unit may be configured to determine a measure of the distance of the particle from the surface of the semiconductor chip in which the at least one photodetector is integrated by comparing signals from photodetectors that are partially shielded by the light-blocking element to signals from photodetectors that are not shielded by the light-blocking element. The control unit may further be configured to take the determined distance into account when determining the physical quantity related to the particulate matter. In particular, size parameters of the PM can be determined more reliably by taking said distance into account.

In order to mechanically protect the substrate, the PM sensor may comprise an enclosure that laterally encloses the substrate, the enclosure being made of a mold material.

According to a further aspect of the invention, a PM sensor module comprises a housing and a flow channel arranged in the housing. Further, the PM sensor module comprises a fan or a heater arranged in the housing and adapted to move air through the flow channel as well as the PM sensor as described in any of the embodiments above or in one of the embodiments below, wherein the PM sensor is arranged in the housing such that a part of the flow channel coincides with the detection volume.

According to another aspect, the present invention provides a method for determining a physical quantity of particulate matter using a particulate matter sensor as described herein. The method comprises:
operating the light source to emit the light beam;
operating the at least one photodetector to detect light that has been scattered by particulate matter crossing the light beam; and
analyzing signals from the at least one photodetector to determine at least one parameter that is indicative of the physical quantity of the particulate matter.

Determination of the at least one parameter may involve determining optical power of the light source and/or determining a distance of the particle from the surface of the semiconductor chip in which the at least one photodetector is integrated and/or carrying out differential measurements of signals from shielded and unshielded partitions, as explained above.

According to another aspect, the present invention provides a method for manufacturing a particulate matter sensor as described herein, the method comprising the following steps:
a) forming at least one photodetector in a surface of a semiconductor chip;
b) etching the semiconductor chip along a direction that is perpendicular to said surface to form at least part of a cavity;
c) optionally, bonding the semiconductor chip to a spacer, the spacer forming another part of the cavity;
d) arranging a light source in the cavity, the light source being configured to emit a light beam towards a first end of the cavity;
e) optionally, providing an optical element on the semiconductor chip, the optical element delimiting the cavity at the first end, the optical element being configured to shape the light beam.

Step b) is typically carried out after step a) but may also be carried out before step a). Step c), if present, is typically carried out after steps a) and b). Step d) is typically carried out after steps a) and b) and, if present, after step c). Step e) may be carried out simultaneously with steps a) and b), as in the case of a DOE integrated into a membrane that is formed by layers of the CMOS layer stack, or it may be carried out after any of step b) to d).

The method may involve further steps, for instance, forming at least part of the control unit, i.e., an ASIC, in the semiconductor chip as described herein, disposing an optical filter on the semiconductor chip as described herein, applying a coating to the cavity walls and/or to a back side of the semiconductor chip and/or spacer as described herein, forming an optical element by any one of the methods described herein, arranging the light source and the substrate on a base substrate, forming wire bonds between the ASIC and the base substrate and/or between the light source and the base substrate, enclosing the substrate in an enclosure made of a mold material, and integrating the PM sensor in a PM sensor module as described herein.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 10 shows a schematic longitudinal section through a PM sensor according to another embodiment of the invention;

FIG. 11A shows a schematic longitudinal section through a PM sensor according to an embodiment of the invention, illustrating the PM sensor in greater detail than FIGS. 1-10;

FIG. 11B shows a schematic function diagram of the PM sensor in FIG. 11A;

DETAILED DESCRIPTION

Throughout the present specification and claims, the terms "in particular", "preferably" and "optionally" are to be understood to express that the corresponding subject-matter is optional.

Figure 1:
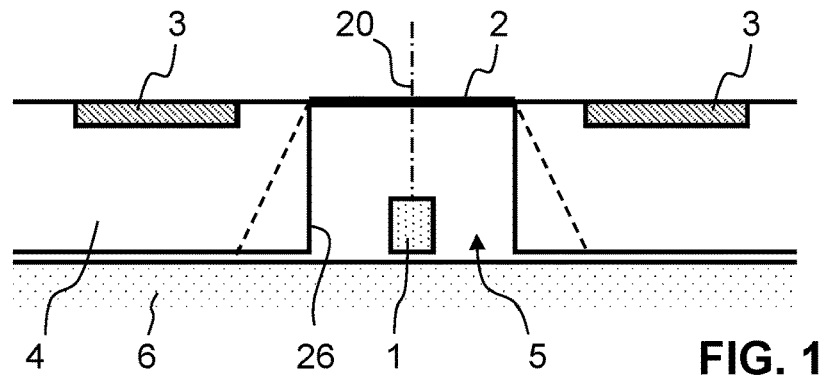
FIG. 1 shows a schematic longitudinal section through a PM sensor according to an embodiment of the invention.
Figure 2:
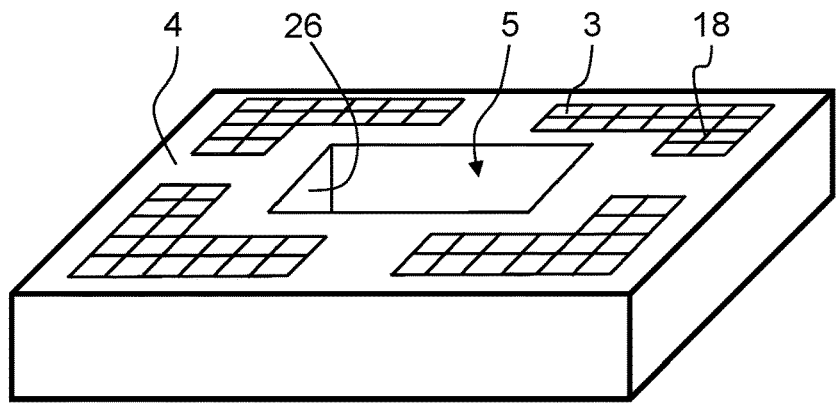
FIG. 2 shows a perspective view of the PM sensor of FIG. 1.
Figure 3:
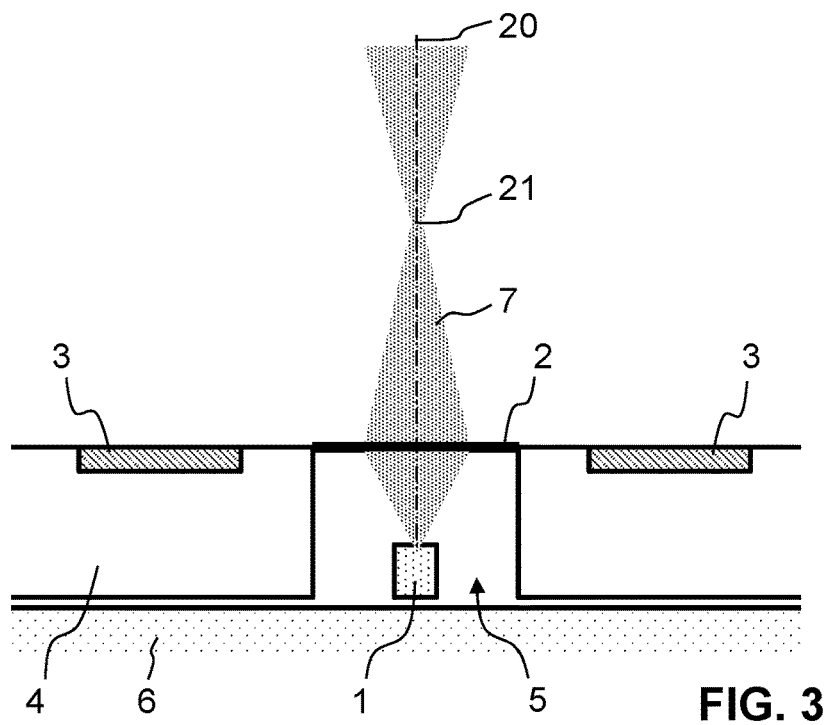
FIGS. 3 to 6 show different aspects of the PM sensor of FIG. 1.

General Setup of PM Sensor (FIGS. 1 and 2)

FIG. 1 shows a schematic cut through a PM sensor according to an embodiment, while FIG. 2 shows a perspective view of the PM sensor. On a base substrate 6, a cavity 5 is formed in a substrate, which in the present example is formed by a semiconductor chip 4. Alternatively, the base substrate 6 may also be part of the semiconductor chip 4. The cavity is delimited by side walls 26 that are formed by the substrate. The cavity 5 preferably is formed from a bottom side (back side) of the substrate, and hence may also show inclined side walls as indicated by the dashed lines. A light source 1 is arranged in the cavity 5 at its bottom end, i.e., the end facing the base substrate 6. An example for the light source 1 is a laser diode, in particular, a vertical-cavity surface-emitting laser (VCSEL). At an upper end of the cavity 5, i.e., the end opposite to the bottom end, an optional optical element 2 is arranged, thus closing the cavity 5. The optical element 2 defines an optical axis 20. Further, photodetectors 3, e.g., photodiodes, are integrated into the semiconductor chip 4 on two or more sides of the optical element 2.

As depicted in FIG. 1, the photodetectors 3 are integrated into an upper surface of the semiconductor chip 4, facing away from the base substrate 6. This surface defines a plane, which in the following will be called the "photodetector plane". The photodetector plane extends perpendicular to the optical axis 20. In the embodiment of FIG. 1, the optical element 2 is arranged essentially in the photodetector plane. In particular, the optical element 2 should not protrude by more than 1 mm above the photodetector plane. The reason for this has been discussed above and is illustrated in FIG. 9: A protruding lens 15 leads to a shadowing such that a scattered light pulse 10 scattered by a PM particle much closer to the lens 15 than particle 9 would not reach the photodetectors 3 and thus not be detected.

As indicated in FIG. 2, an upper surface of the semiconductor chip 4 may comprise arrays of photodetectors 3, e.g., four arrays of photodetector pixels. Metallizations 18 are provided between or around the individual photodetector pixels. The metallizations 18 may be made of any electrically conducting material. Advantageously, they are formed during regular processing of a CMOS layer stack of the semiconductor chip 4 by exposing one of the metal layers on the surface. The metallizations 18 act as a Faraday cage when grounded and shield the photodetectors 3 from electromagnetic interference and hence from spurious signals. In particular, some of the metallization layers of the CMOS layer stack may form connections for reading out the photodetectors, while at least one of the metallization layers (preferably the topmost layer) may be grounded to acts as a Faraday cage. A ground contact may be formed on the semiconductor chip for connecting the corresponding layer to ground. Preferably, the photodetector pixels 3 each have a planar dimension of less than $1\times1$ mm$^2$, preferably less than $0.5\times0.5$ mm$^2$, and even more preferably less than $0.3\times0.3$ mm$^2$. The same square measures apply in case of non-square shaped pixels, such as circular shaped pixels.

In FIG. 2, the optical element 2 is not shown. Indeed, in some embodiments, the optical element 2 can be left away, e.g., if the light source 1 itself already produces a light beam with sufficiently small divergence.

Operation of PM Sensor (FIGS. 3 to 6)

Figure 4:
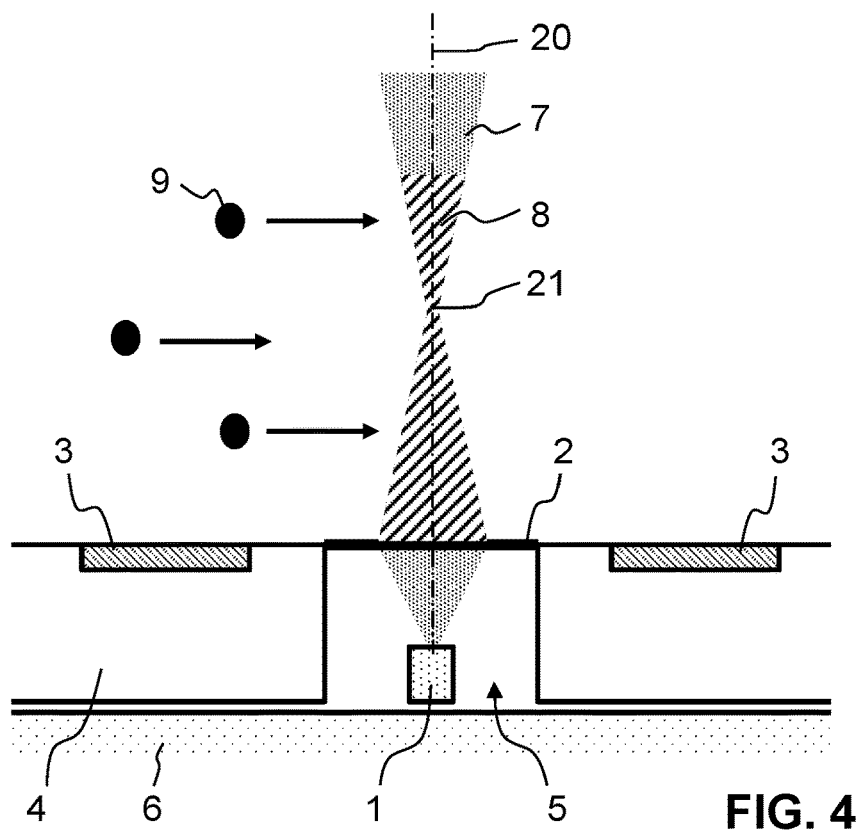

FIGS. 3 to 6 illustrate various aspects of the PM sensor of FIG. 1. The light source 1 is switched on, thus emitting light towards the optical element 2. The optical element 2 shapes the light beam 7 and in particular focusses the light beam 7 at a focus 21. In a measurement setup, PM particles 9 approach the light beam 7 as shown in FIG. 4. This may e.g., be achieved by placing the PM sensor on a wall of a flow channel, wherein air with PM is blown through the flow channel by a fan or alternatively a heater (see discussion of FIGS. 28 and 29 below).

Figure 5:
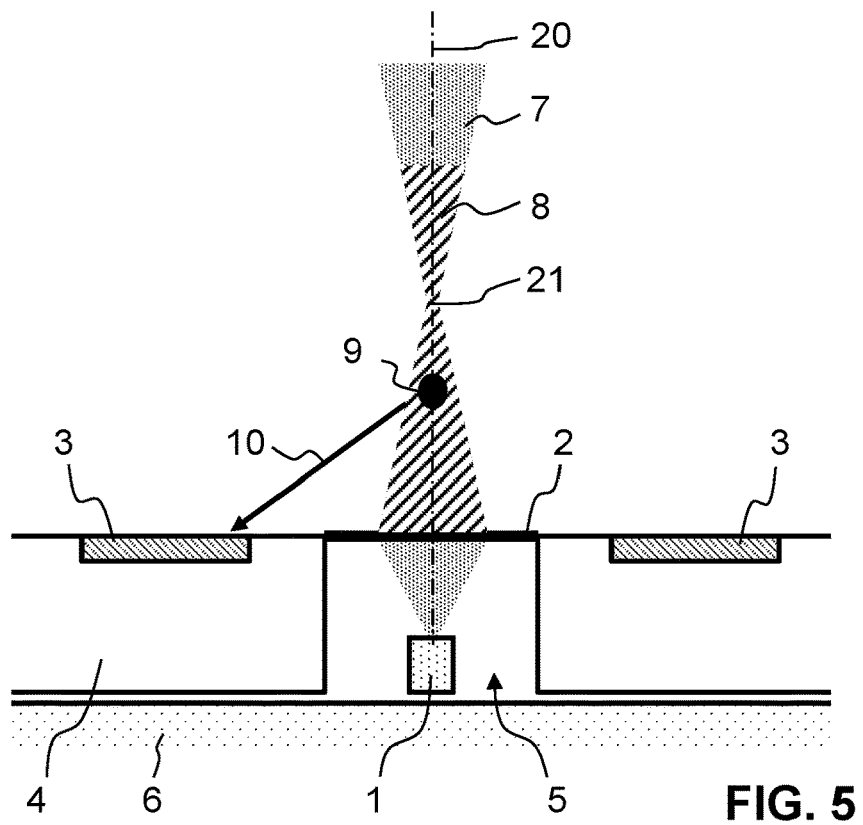
Figure 6:
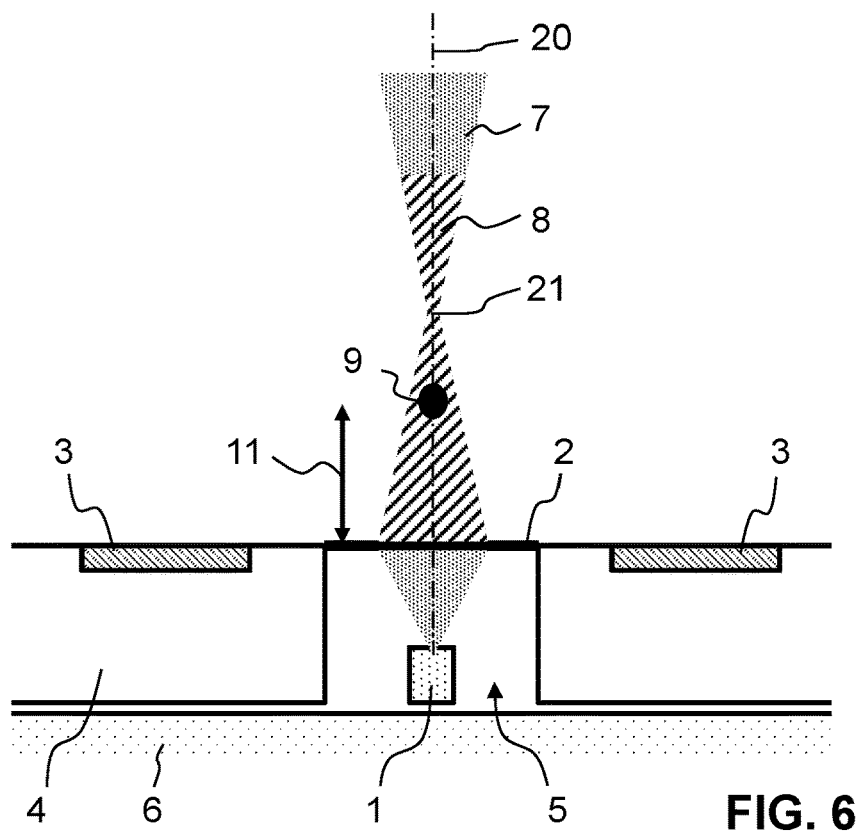

FIGS. 4 to 6 depict a part of the light beam 7 with a different hatching: This is the detection volume 8 defined in that a PM particle 9 present in the detection volume 8 generates a large enough scattered light pulse 10 such that it is detected by at least one of the photodetectors 3, meaning that a resulting signal in the photodetector 3 is above the noise level, e.g., dark current noise.

The proposed setup with a focusing optical element 2 and photodetectors 3 in the same plane has the advantage that the detection volume 8 reaches at least up to the focus 21 of the optical element 2. The geometrical reasons for this have been discussed above. In particular for large PM particles 9, the detection volume 8 may even extend beyond the focus 21, i.e., a scattering particle height 11 may be larger than the focal length of the optical element 2 while the particle is still detected.

In general, the size and shape of the detection volume 8 may be optimized or adjusted to specific applications by varying one or more of the parameters optical powers of the light source 1, focal length of the optical element 2, distance between light source 1 and optical element 2, distance between optical element 2 and photodetectors 3, sensitivity of photodetectors 3, electromagnetic shielding thus lowering the noise level, etc.

Design of Optical Element

Figure 7:
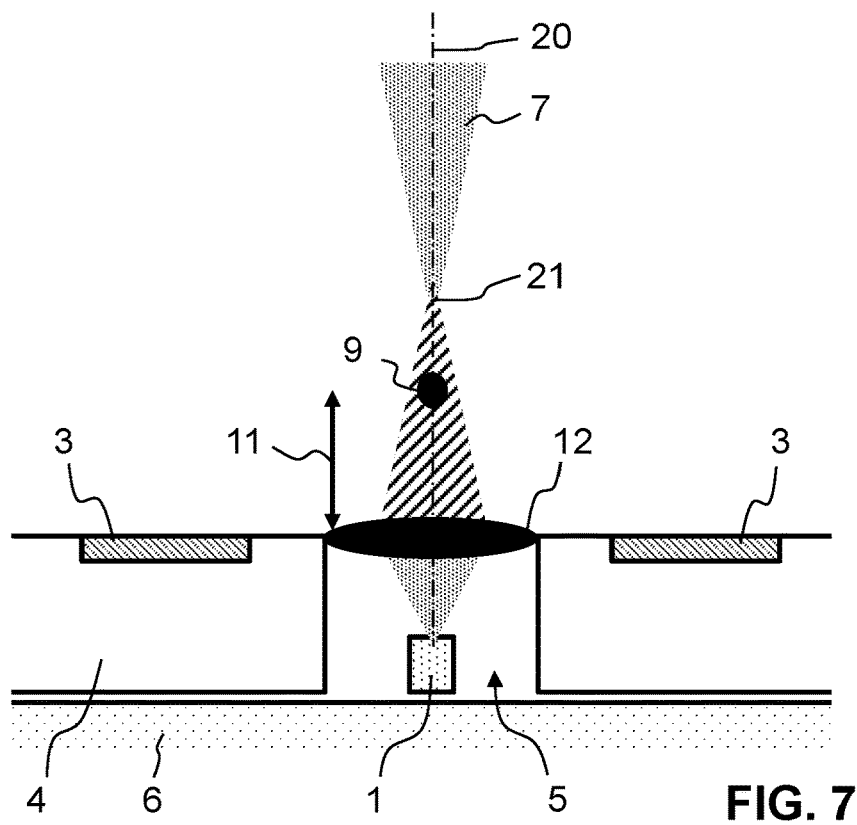
FIGS. 7 to 9 show schematic longitudinal sections through PM sensors with different optical elements according to embodiments of the invention.
Figure 8:
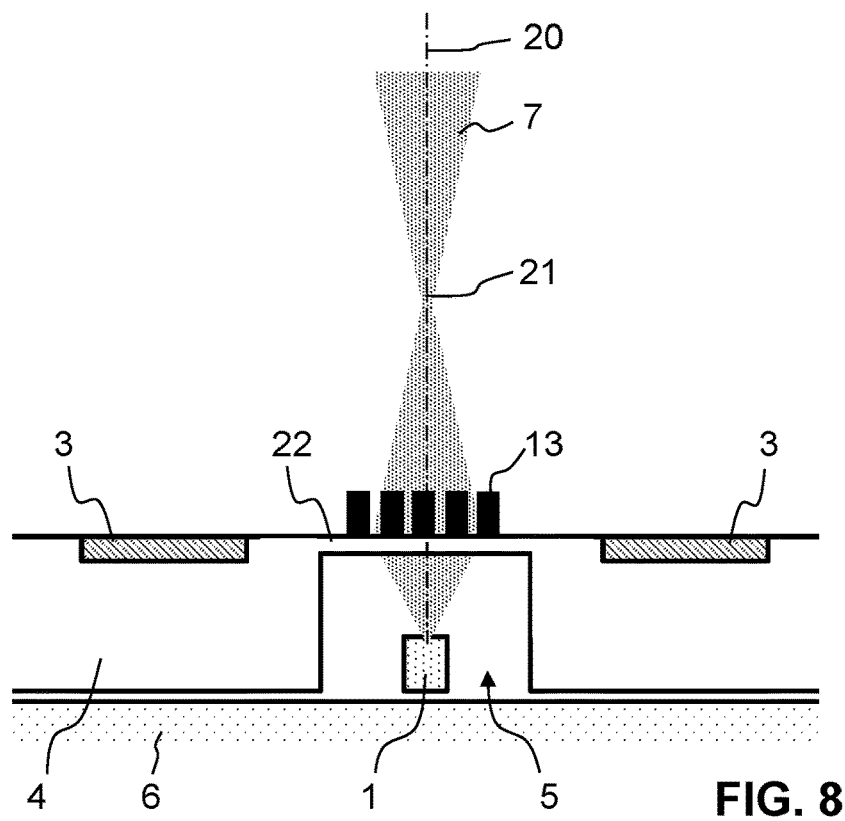
Figure 9:
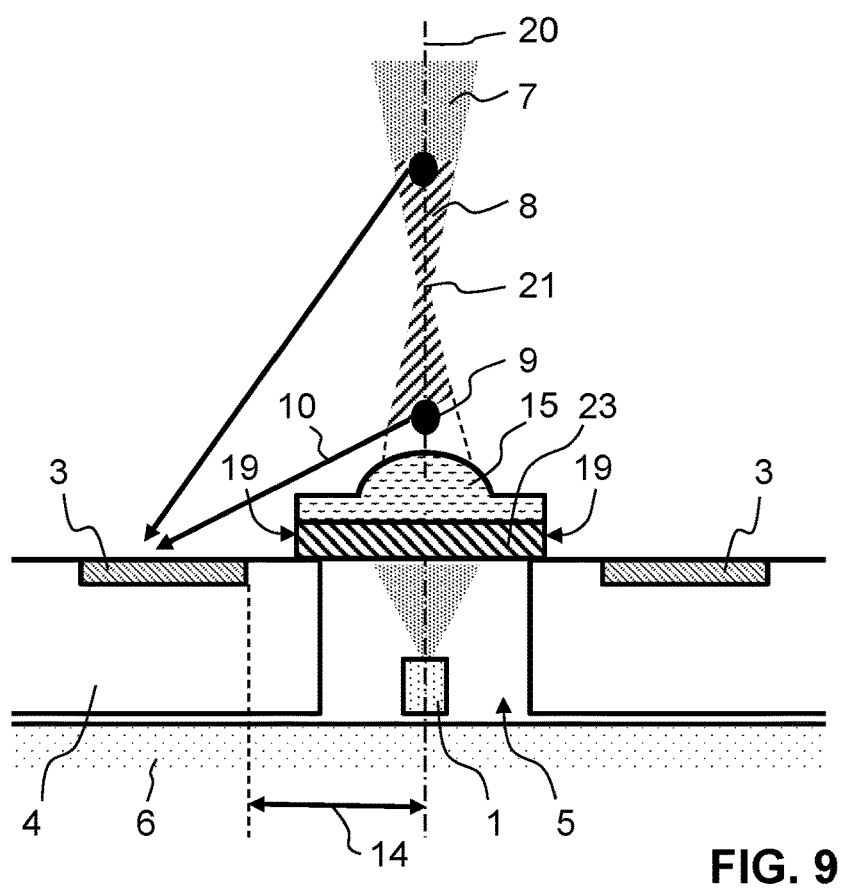

FIGS. 7 to 9 show similar embodiments of a PM sensor as FIG. 1, however, with different optical elements 2. In FIG. 7, the optical element is a conventional optical lens 12, e.g., made from glass or a polymer. Depending on the optical index of the lens material, a conventional optical lens 12 needs to have a certain thickness in order to exhibit a desired focal length due to the laws of refraction.

An alternative optical element is shown in FIG. 8: A diffractive optical element (DOE) 13, e.g., arranged on a membrane 22, may be constructed with a smaller thickness for the same focal length. The membrane 22 for the DOE 13 may be exposed from the CMOS layer stack of the semiconductor chip 4 during manufacturing. In a particular embodiment, the DOE 13 may be a metamaterial, e.g., where a surface of the membrane has been structured such that it effectively acts as an optical lens.

FIG. 9 shows yet another optical element: A lens is disposed on a carrier substrate, e.g., a polymer lens 15 is disposed on a glass carrier substrate 23 as described above. Such lens 15 on a glass carrier substrate 23 may be manufactured as an imprint polymer lens on the glass carrier substrate 23 and then mounted on the semiconductor chip 4, e.g., by means of an adhesive. Since thermal expansion coefficients of the glass carrier substrate 23 and the semiconductor chip 4 match or are at least similar, strain in the adhesive is reduced upon temperature cycling.

FIG. 9 further illustrates a geometrical consideration relating to the spreading of the spherical wavefront of the scattered light as explained above: A distance 14 of the photodetectors 3 from the optical axis 20, and thus from the optical element, is advantageously minimized. This leads to a large detection volume 8, or in other words, to a high PM count.

FIGS. 9 and 10 depict another advantageous feature of an embodiment of the invention. The side walls of the optical element 2, in this case of the glass carrier substrate 23 carrying the lens 15, are provided with a light barrier 19, e.g., a blackening or a silvering. This prevents that stray light from the optical element reaches the photodetectors 3 on a direct path, which would significantly raise the noise level and decrease the PM sensor's ability to detect PM particles, i.e., it would significantly decrease the detection volume 8. The blackening or silvering may be achieved by applying a selective coating to the glass carrier substrate 23, e.g., a chemical that binds to and blackens/silvers the glass of the glass carrier substrate 23 but not the polymer lens 15. In addition, such a coating is by its very nature thin and does hence not add in a material way to the lateral thickness of the optical element and hence does not worsen the shadowing described above.

FIG. 10 shows a schematic cut through a PM sensor according to another embodiment. This PM sensor shares most features with the one of FIG. 1. However, it only has photodetectors 3 on one side of the optical element, which in the shown embodiment again is a lens 15 on a carrier substrate 23. On the opposite side, the optical element is supported by a support 16, which may e.g., be a molded frame or a dummy substrate spacer formed by the substrate. The PM sensor of FIG. 10 may evidently have a smaller signal-to-noise ratio than the PM sensor of FIGS. 1 to 9. However, the present PM sensor may be built with an even smaller form factor, making it well suited for miniaturized applications.

Details of the PM Sensor (FIG. 11A)

FIG. 11A illustrates an embodiment of a PM sensor that is similar to the embodiment of FIG. 9, the sensor being shown in greater detail than in FIGS. 1 to 10.

In this embodiment, the semiconductor chip 4 is a silicon chip carrying a CMOS layer stack 24. The photodetectors 3 are formed in the semiconductor material by a CMOS process. For instance, each photodetector 3 can be a photodiode formed by creating a negatively doped well in a positively doped portion of the silicon chip. For light to be able to reach this photodiode, the CMOS layer stack above the photodiode is removed by means of etching. The anode and cathode of the photodiode are connected to metallization layers of the CMOS layer stack 24.

Analog and digital electronic circuitry is formed in the CMOS layer stack 24. The electronic circuitry forms an application specific integrated circuit (ASIC). The ASIC acts, inter alia, as a control unit 27, as will be explained below with reference to FIG. 11B.

An auxiliary photosensitive detector 25 for determining the optical power of the light source 1 is formed in the semiconductor chip 4. This detector may also be called a "feedback detector" because it can provide feedback to regulate the output of the light source 1 in a closed loop. The auxiliary detector 25 may be of the same type as the main photodetectors 3. Preferably, it is a photodiode. The auxiliary detector 25 may be formed in the semiconductor chip 4 in the same manner as the main photodetectors 3. It is preferably arranged very close to a surface of a side wall 26 that delimits the cavity 5. The auxiliary detector preferably has a surface area that is very small as compared to the total surface area of the main photodetectors 3. For instance, it may cover a surface area of less than 100 µm×100 µm, e.g., 50 µm×50 µm. In this manner, the auxiliary detector 25 is relatively insensitive to light that has been scattered by PM in the detection volume 8. However, it is sensitive to light that may reach the auxiliary detector 25 through other light paths.

The light received by the auxiliary detector 25 can have at least two different origins. On the one hand, the auxiliary detector 25 can receive light that has been emitted by the light source 1 roughly along its main direction of emission, i.e., roughly along the direction of the light beam 7, and has been scattered away from this direction before the light has exited the optical element. Such scattering may take place, e.g., at a surface of the optical element or within the optical element. In the present disclosure, this type of light is designated as "stray light". On the other hand, the auxiliary detector 25 can receive light that has been emitted by the light source along other directions than its main direction of emission. For instance, if the light source is a VCSEL, the light source has a main emission surface, at which the light beam 7 is emitted, and it has lateral side walls. The main emission surface faces in the direction of the light beam. A VCSEL typically generates some amount of light also at its lateral side walls by spontaneous emission. This light can propagate to the auxiliary detector 25 as well.

In the example of FIG. 11A, there are at least three possible light paths from the light source 1 to the auxiliary detector 25:

A first light path extends through the semiconductor chip 4. The penetration depth of light into silicon depends on the wavelength. At a typical IR wavelength of 940 nm, the light intensity is reduced to around 10% ($1/e^2$) after around 100 µm. This light path is particularly relevant for light generated by spontaneous emission. If it is desired to monitor the optical power of the light source 1 by monitoring the intensity of light generated by spontaneous emission, the auxiliary detector 25 should therefore be arranged as close as possible to a surface of a side wall 26 that delimits the cavity 5, and the surface of the side wall 26 should not be covered by an opaque material. In addition, the top surface of the auxiliary detector 25 may be covered by at least some of the layers of the CMOS layer stack in order to prevent light impinging from above from the auxiliary detector 25.

A second light path extends through the CMOS layer stack 24. The CMOS layer stack may act as a light guide perpendicular to the optical axis of the optical element, i.e., in or parallel to the photodetector plane. Light that enters the CMOS layer stack will thus be guided to the auxiliary detector 25. In some embodiments, stray light and/or light from spontaneous emissions may enter the CMOS layer stack at a cavity wall 26, as in the embodiment of FIG. 11A. However, in practice, this mechanism can often be neglected. In other embodiments, a membrane 22 is formed by one or more layers of the CMOS layer stack, as in the embodiment of FIG. 8, and stray light can originate from scattering events within the membrane 22 and/or at its boundaries, resulting in stray light being generated directly within the CMOS layer stack. This light path is active even if an opaque layer is present on the surface of the side walls 26 of the cavity 5.

A third light path extends through the optical element. In the example of FIG. 11a, the optical element is a polymer imprint lens 15 on a glass carrier substrate 23. The glass carrier substrate 23 is able to guide stray light to a portion of its bottom surface that is arranged directly above the auxiliary detector 25. Light that exits this portion of the glass carrier substrate 23 may hit the auxiliary detector 25 from above. Similar considerations may apply also to other types of optical elements. Also this light path is active even in the presence of an opaque layer on the surface of the side walls 26 of the cavity 5.

Depending on the arrangement of the auxiliary detector 25 relative to the cavity 5 (in particular, its lateral distance from the cavity walls), on the presence or absence, type and arrangement of the optical element (e.g., whether or not an optical element is present, whether or not the optical element includes a membrane fabricated from the CMOS layer stack, whether or not there is a direct light path from the optical element to the top of the auxiliary detector, whether or not the auxiliary detector is covered by one or more opaque layers of the CMOS layer stack), and on further measures like the addition of an opaque layer on the surfaces of the cavity side walls, the light that is received by the auxiliary detector 25 can be dominated either by stray light or by light originating from spontaneous emissions. Accordingly, the control unit 27 may determine the optical power of the light source from stray light, from spontaneous emissions, or from a combination of both.

An optical filter 28 is disposed on the top surface of the semiconductor chip 4, covering both the photodetectors 3 and the auxiliary detector 25. The optical filter 28 is an optical bandpass filter, allowing only light in a wavelength range that comprises the wavelength of the light source 1 to pass. The optical filter 28 is an interference filter that is applied using a wafer level process in which several layers of different refractive indices are stacked on top of each other. The thickness of each layer may be in the range of approximately a quarter wavelength of the dominant wavelength of the light source. This leads to destructive interference for all wavelengths except for the desired wavelength band. For the main photodetectors 3, the optical filter 28 helps to avoid DC saturation and elevated noise levels due to environmental light, thereby improving the signal-to-noise level of signal pulses originating from PM. For the auxiliary detector 25, the optical filter 28 reduces the contribution of environmental light to the output signal, rendering the auxiliary detector 25 relatively insensitive to environmental light.

Bonding and packaging of the PM sensor can be carried out as follows: The base substrate 6 may be, for instance, a land grid array (LGA). The light source 1 and the controller 27 may be connected to lands of the LGA by wirebonds 31. During manufacture of the PM sensor, the light source 1 may initially be mounted on the LGA and may be wire bonded to the appropriate lands of the LGA. In some embodiments, an LGA with a light source bonded to it may be provided as a preassembled unit. For instance, VCSELs are sometimes provided in the form of a preassembled unit on an LGA. Thereafter, the semiconductor chip 4 with its cavity 5 and the CMOS layer stack 24 may be mounted on the LGA (e.g., glued to the LGA) in such a manner that the light source 1 is arranged in the cavity 5. The circuitry in the CMOS layer stack 24 may then also be wirebonded to the LGA. Thereafter, the resulting assembly may be partially encapsulated in an enclosure 32 by open cavity molding, leaving the photodetectors 3, the auxiliary detector 25, and the cavity 5 accessible from above. In some embodiments, the optical element is finally attached to the semiconductor chip 4 to cover the cavity 5. In other embodiments, the optical element may have been created or attached to the semiconductor chip in a previous production step.

In the embodiment of FIG. 11A, as in some other embodiments, the optical element is a polymer lens 15 on a glass carrier substrate 23. In particular, the lens may be a "wafer-level optics lens" or briefly "WLO lens". In waferlevel optics, a carrier substrate is provided in the form of a wafer, optical structures are created on the wafer, and the wafer is subsequently diced. In particular, polymer lenses can be created on a wafer by coating the wafer with a UV curable polymer, imprinting the uncured polymer with a wafer-sized stamp, and UV curing the polymer. In the present disclosure, polymer lenses created in this manner are called imprint polymer lenses.

The side walls of the glass carrier substrate 23 may be provided with a light barrier 19, i.e., an opaque coating, to prevent stray light from reaching the photodetectors 3. The light barrier 19 may be a mirror-like silvering, which may be applied to the side walls of the glass carrier substrate 23 using the well-known silver nitrate mirroring process. To this end, after creating the polymer lenses 15 on the glass wafer that forms the glass carrier substrate, the wafer is mounted on a dicing foil and diced. Subsequently, the diced wafer is treated by the silver nitrate mirroring process. Since the back side of the wafer is protected by the dicing foil and the polymer from which the lenses are formed does not react with the chemicals, it is only the diced side walls of the glass carrier substrate 23 on which the mirror is formed.

To further reduce the risk of stray light problems, a further coating 29 that forms a diaphragm defining an aperture may be provided on the top and/or bottom surface of the glass carrier substrate 23. The coating 29 may be, for instance, a chromium coating. In the example of FIG. 11A, a chromium coating has been applied to the top surface of the glass carrier substrate 23.

The coating forms a diaphragm defining an aperture, and the polymer lens 15 is disposed in the aperture. Instead of or in addition to forming a diaphragm on the top of the glass carrier substrate, a diaphragm defining an aperture may also be formed on the bottom of the glass carrier substrate.

While the principles of a wafer-level optical element have been explained using the example of a glass wafer that forms a glass carrier substrate, the carrier substrate may also be formed of a different material than glass.

Control Unit (FIG. 11B)

FIG. 11B is a schematic functional diagram of the PM sensor of FIG. 11A. The control unit 27 receives signals both from the photodetectors 3 and from the auxiliary photosensitive detector 25. The control unit 27 processes the signals from the photodetectors 3 to detect signal pulses corresponding to light pulses originating from PM in the detection volume 8 of the light beam 7. The control unit 27 further analyzes these signal pulses to derive at least one parameter that is indicative of a physical quantity of the PM, such as a parameter that is indicative of PM concentration, at least one PM size parameter (e.g., average size and/or at least one parameter that characterizes the size distribution), and/or at least one PM velocity parameter. For instance, determination of a PM concentration parameter may be based on the number of pulses per unit of time and a known, measured, or estimated flow rate of the fluid flow past the PM sensor, as it is well-known per se. Determination of PM size parameters can be based on the amplitude of the pulses, as it is also well-known per se. When calculating PM parameters, the control unit 27 may take into account the optical power of the light source 1, as represented by the signals from the auxiliary detector 25. The control unit 27 may further use the signals from the auxiliary detector 25 to control the optical output power of the light source 1 by a closed-loop control algorithm. The control unit may also take the distance of the PM particles from the photodetector plane into account, as will be explained in more detail in conjunction with FIG. 12.

In summary, the control unit 27 has two main purposes: a) processing signals from the photodetectors 3 to derive at least one parameter that is indicative of a property of the PM; and b) monitoring and, optionally, controlling output power of the light source 1, using the auxiliary detector 25.

In some embodiments, the control unit 27 may be implemented fully "on-chip" in the ASIC formed by the CMOS layer stack 24. In other embodiments, parts of the functionalities of the control unit 27 may be implemented in said ASIC, while other functionalities may be implemented "off-chip" in external circuitry. The external circuitry may be connected to the ASIC, e.g., via the base substrate 6. For instance, some initial processing steps of the signals received from the main photodetectors 3 and/or the auxiliary detector 25, such as signal amplification, analog-to-digital conversion and filtering, may be carried out on-chip by the ASIC that is formed by the CMOS layer stack 24, while subsequent processing steps, such as calculation steps for calculating a parameter that is indicative of a property of the PM and/or calculation of a control signal for controlling the light source 1, may be carried out off-chip by the external circuitry. The external circuitry may comprise a general-purpose processor or dedicated processor configured to execute a computer program that causes the processor to carry out one or more processing steps for determining said parameter.

Figure 12:
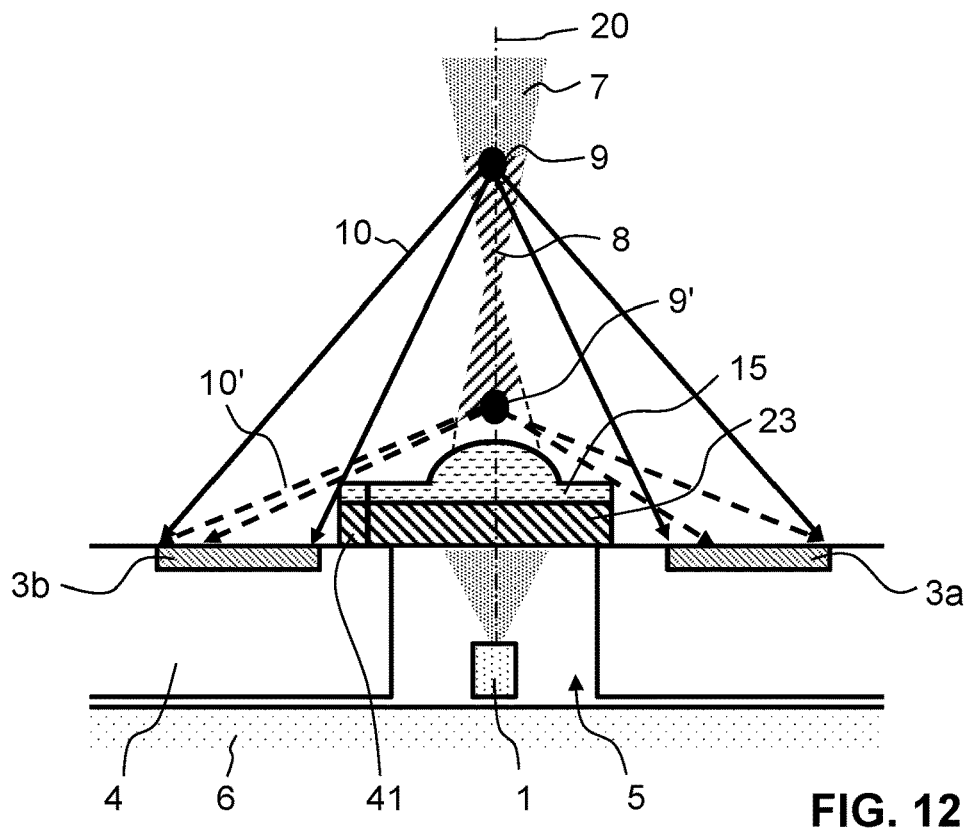
FIG. 12 shows a schematic longitudinal section through a PM sensor according to yet another embodiment of the invention.
Figure 13A:
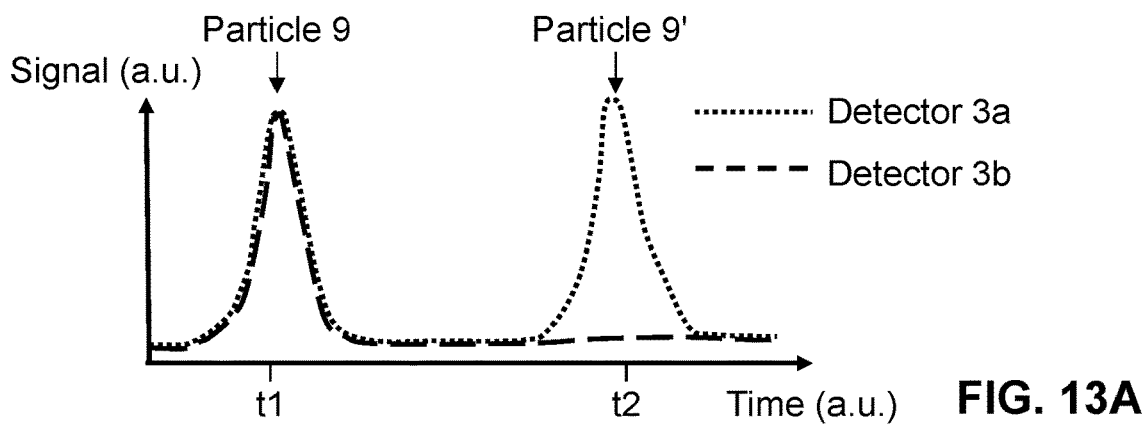
FIGS. 13A and 13B show schematic diagrams illustrating signal processing for a PM sensor according to FIG. 12.
Figure 13B:
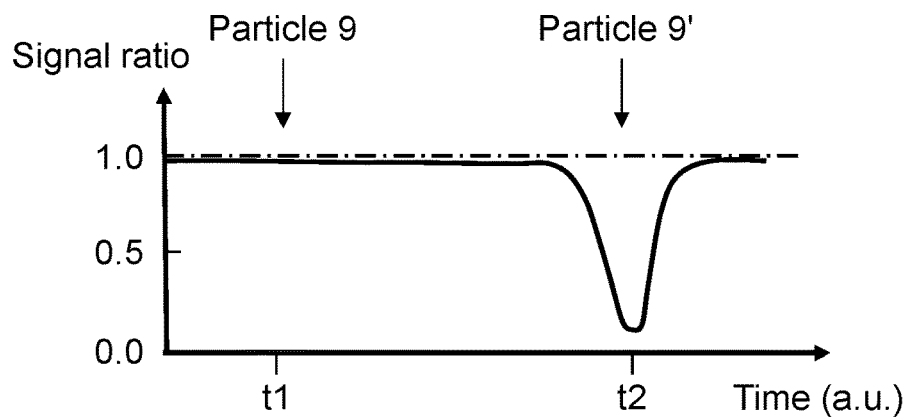

Distance Determination (FIGS. 12, 13A, 13B)

FIG. 12 illustrates an embodiment of a PM sensor that allows a determination of the distance from the photodetector plane at which a detected particle intersected the light beam 7. To this end, the optical element may be complemented by an asymmetric extension 41.

The asymmetric extension 41 selectively extends laterally towards one or more of the photodetectors, partially shielding these photodetectors, while not shielding other photodetectors. In the example of FIG. 12, the partially shielded photodetectors are designated as photodetectors 3b, while the unshielded ones are designated as photodetectors 3a. The asymmetric extension 41 shields the affected photodetectors 3b from some of the light of PM particles that intersect the light beam 7 close to the optical element. This is illustrated in FIG. 12 using the example of two PM particles 9, 9' that pass the PM sensor at different distances from the photodetector plane. Particle 9 passes the PM sensor at a comparatively large distance. The asymmetric extension 41 does not prevent any of the light scattered from this particle from reaching the photodetector 3b. Accordingly, the photodetectors 3a and 3b receive the same amount of scattered light. In contrast, particle 9' passes the PM sensor at a comparatively small distance from the photodetector plane. As the asymmetric extension 41 shield some of the light scattered from particle 9', photodetectors 3a and 3b receive different amounts of scattered light.

FIG. 13A shows, in a schematic way, signal pulses recorded by photodetectors 3a and 3b due to the scattered light received from particles 9 and 9', respectively. At time t1, photodetectors 3a and 3b receive scattered light from particle 9. The resulting signal pulses have approximately the same amplitude. At time t2, photodetectors 3a and 3b receive scattered light from particle 9'. The resulting signal pulse from photodetector 3a is much larger than the pulse from photodetector 3b.

FIG. 13B illustrates the resulting ratio of the signals from photodetectors 3a and 3b. This ratio is a direct measure of the distance of a particle from the photodetector plane when the particle crosses the light beam 7. In particular, the ratio exhibits the following behavior:
a) The closer this ratio is to 1 (signal levels are equal), the further the particle was from the photodetector plane when it crossed the light beam.
b) The closer the ratio is to 0 (no light at the photodetector 3b facing the asymmetric extension due to shadowing), the closer the particle was to the photodetector plane when it crossed the light beam.
c) Ratios between 0 and 1 correspond to different distances of the particle from the photodetector plane.

This information can be used by the control unit 27 to compensate for unwanted effects the said distance may have on the signal levels. For instance, if the intensity distribution of the light beam 7 along the optical axis is known, the control unit 27 can correct the measured pulse amplitudes for the known intensity distribution. As a result, a better estimate of the size of the particles can be obtained. In general terms, better sensor performance can be achieved.

While in FIG. 12, the effect of an asymmetric extension 41 of the optical element is illustrated using the example of a polymer lens 15 on a glass carrier substrate 23, the same concept may also be employed with other types of optical elements.

In more general terms, the asymmetric extension 41 is an example of a light-blocking element that is arranged on the semiconductor chip 4 in such a manner that it selectively shields a portion of one or more of the photodetectors from light that has been scattered from a PM particle in the light beam 7, said portion depending on a distance of the particle from the photodetector plane. The light-blocking element can be separate from the optical element. It can be arranged laterally adjacent to the optical element. It can even be provided if an optical element is absent altogether.

Figure 14:
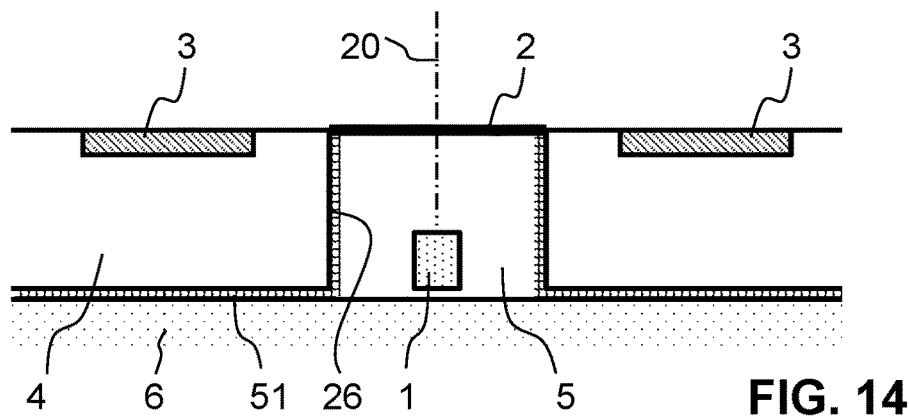
FIGS. 14 to 26 show schematic longitudinal section through PM sensors according to embodiments of the invention.
Figure 15:
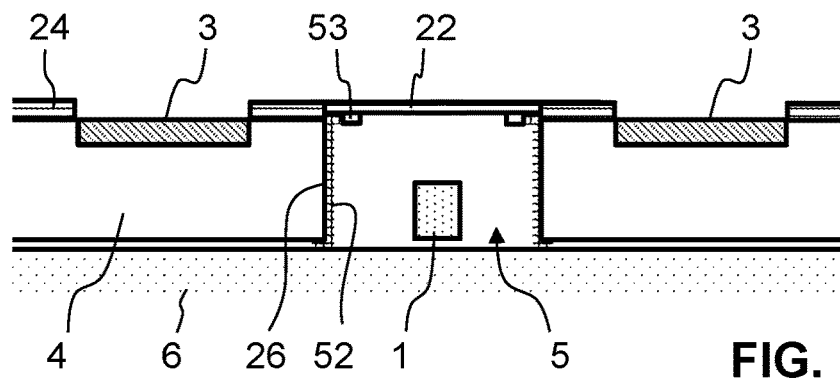

Opaque Coating on Side Walls of Cavity (FIGS. 14 and 15)

Creating a "light blocker", i.e., a coating layer on the side walls of the cavity and/or the bottom side of the semiconductor chip 4 that faces the base substrate 6, the coating layer being opaque to main emission wavelengths of the light source 1, prevents direct and/or stray light from the light source 1 from reaching the photodetectors through the semiconductor chip. In this way, saturation of the detectors can be prevented, and/or (Schottky) noise can be reduced. A lower noise level means that a lower threshold for PM detection can be selected, which results in increased performance. In particular, smaller particles can be detected. Statistics for data evaluation are increased, resulting in better accuracy.

In the embodiment of FIG. 14, such a coating layer is formed by a back side metallization 51 of the semiconductor chip 4. Such a metallization can be created, for instance, by sputter deposition. If the deposition process is performed after the cavity was etched into the semiconductor chip, then the cavity side walls will be automatically covered with the metallization 51 as well. Examples of suitable materials for the metallization are, without limitation, Al, Cu, Ag, Ti and TiN. Sensible metallization thicknesses range from 50 nm up to 1 µm or more.

However, such a metallization process is incompatible with product designs that comprise a membrane formed by one or more CMOS layers, as in the example of FIG. 8, because the metallization would render the membrane opaque. Therefore, other processes for creating an opaque coating on the chip surface should be used for such embodiments.

An embodiment in which an opaque coating 52 has been created by an alternative process is illustrated in FIG. 15. In this embodiment, a membrane 22 formed by one or more layers of the CMOS layer stack 24 spans the cavity 5. The membrane may be part of the optical element, as will be explained in more detail below, or it may simply be provided for protecting the light source from contaminations. The opaque coating 52 can be created by waferlevel inkjet printing into the cavity 5. This process is very cost-efficient. It is compatible with product designs that use a membrane 22 due to the small drop sizes. To prevent ink from spilling towards the membrane center, which should remain transparent to allow the light beam to pass through, a flow stop structure 53 (e.g., a ring structured from an oxide in the membrane) can be designed into the membrane 22.

It is noted that the ink that is disposed on the membrane 22 radially outside the flow stop structure 53 may be considered to represent another example of a diaphragm that defines an aperture, as discussed above by the way of the example of a Chromium coating.

In both embodiments (metallization or inkjet coating), it is advantageous if the cavity side walls are tilted towards the back side of the semiconductor chip 4, as indicated by the dashed lines in FIG. 1.

Figure 16:
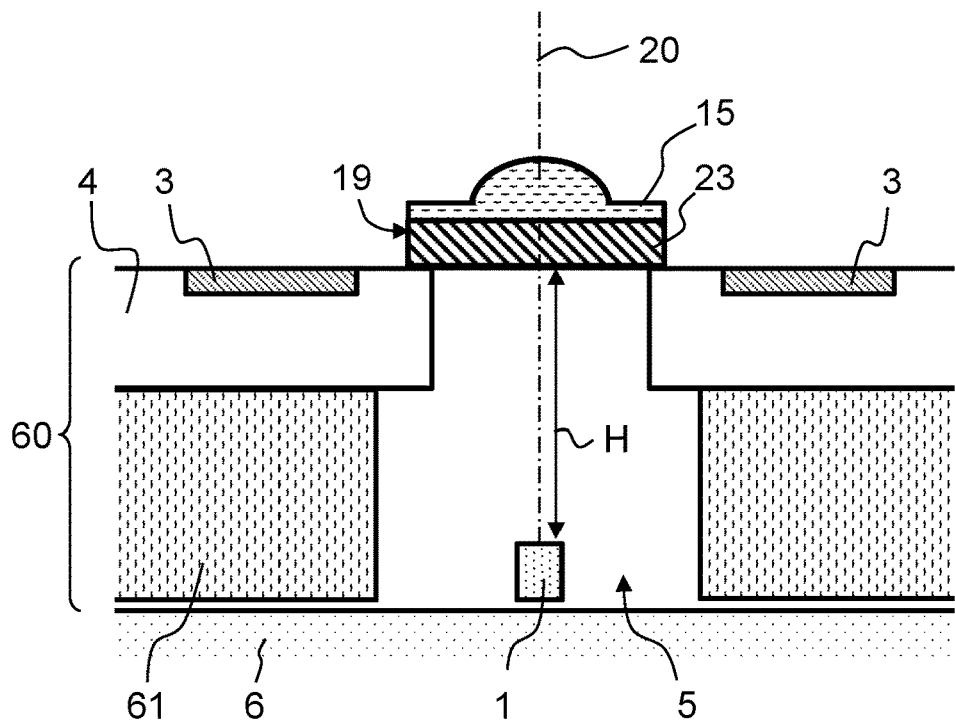

Spacer (FIG. 16)

FIG. 16 illustrates an embodiment wherein a spacer 61 is arranged between the base substrate 6 and the semiconductor chip 4. The spacer 61 and the semiconductor chip 4 together form a substrate 60.

The spacer 61 is preferably also made of silicon. The spacer 61 has a central opening (through-hole) that extends all the way from the bottom side of the spacer 61, which faces the base substrate 6, to its top side, which faces the semiconductor chip 4. The central opening is arranged coaxially with the cavity in the semiconductor chip 4. The cavity in the semiconductor chip 4 and the central opening in the spacer 61 together form the cavity 5 in which the light source 1 is arranged.

In the embodiment of FIG. 16, the central opening in the spacer 61 has lateral dimensions that are slightly larger than those of the cavity in the semiconductor chip 4. However, in other embodiments, the lateral dimensions of the opening in the spacer 61 can be the same or smaller than those of the cavity in the semiconductor chip 4.

The spacer 61 increases the distance H between the light source 1 and the optical element along the optical axis 20. A larger distance H allows for the use of optical elements with a larger focal length. On the one hand, such optical elements may be easier to produce. On the other hand, a larger focal length of the optical element offers the possibility of increasing the distance between the optical element and the focus of the light beam. It should be noted that this distance is not necessarily identical with the focal length of the optical element, as the location of the focus generally depends on the emission characteristics of the light source (e.g., divergent vs. collimated) and, in the case of divergent emission, on the distance H between the light source and the optical element. By increasing the distance between the optical element and the focus of the light beam, the size of the detection volume 8 can be increased. A larger distance H between the light source 1 and the optical element also reduces the sensitivity of the setup to variations in the manufacturing process and the materials, in particular, to thickness variations of the semiconductor chip 4, thereby increasing production stability and reducing device-to-device variations in performance. This is of particular importance if a collimated (cylindrical) light beam, as opposed to a focused light beam, is used, because collimation is particularly sensitive to tolerances of the distance between the light source and the optical element.

If no spacer is used, the distance H is limited by the maximum available thickness of the wafer from which the semiconductor chip 4 is produced. For example, the maximum thickness at which 8-inch silicon wafers are available commercially is typically 720 µm. By using a spacer that is manufactured from a silicon wafer as well, the total thickness of the substrate 60 can be easily doubled. If even greater thickness is desired, two or more spacers can be stacked, or a thicker spacer can be obtained by using larger wafers, which may be available at larger thickness.

As a result, the thickness of the semiconductor chip 4 in which the photodetectors 3 are integrated becomes a freely adjustable design parameter. For instance, it becomes possible to use a thin silicon wafer (typically around 300 µm) for manufacturing the photodetectors 3 and the electronic circuitry and to compensate for the rest of the required distance between the light source 1 and the optical element by using a spacer 61 of the desired thickness.

A wafer in which the photodetectors are integrated, and a silicon spacer wafer can be connected by readily available bonding techniques before dicing, such as a «direct bonding» process, where two Si wafers are bonded to each other using Van-der-Waals forces. Alternatively, «Adhesive Bonding», using a structured foil as bond interface, is also available.

If desired, an opaque coating can be applied to the side walls of the central opening and/or the back side of the spacer, as described above for the semiconductor chip in which the photodetectors are integrated.

While FIG. 16 shows an optical element in the form of a polymer lens 15 on a glass carrier substrate 23, any optical element can be used in conjunction with a spacer.

Figure 17:
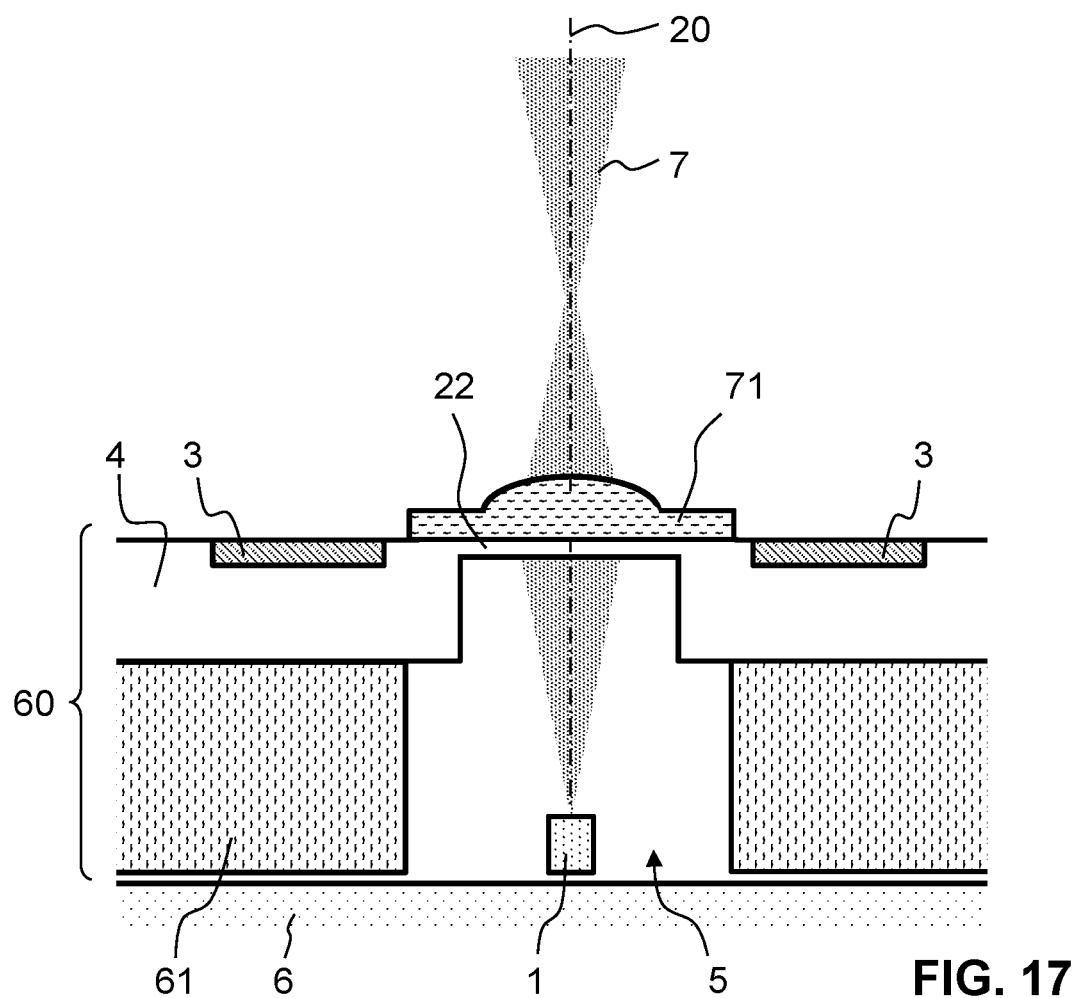
Figure 18:
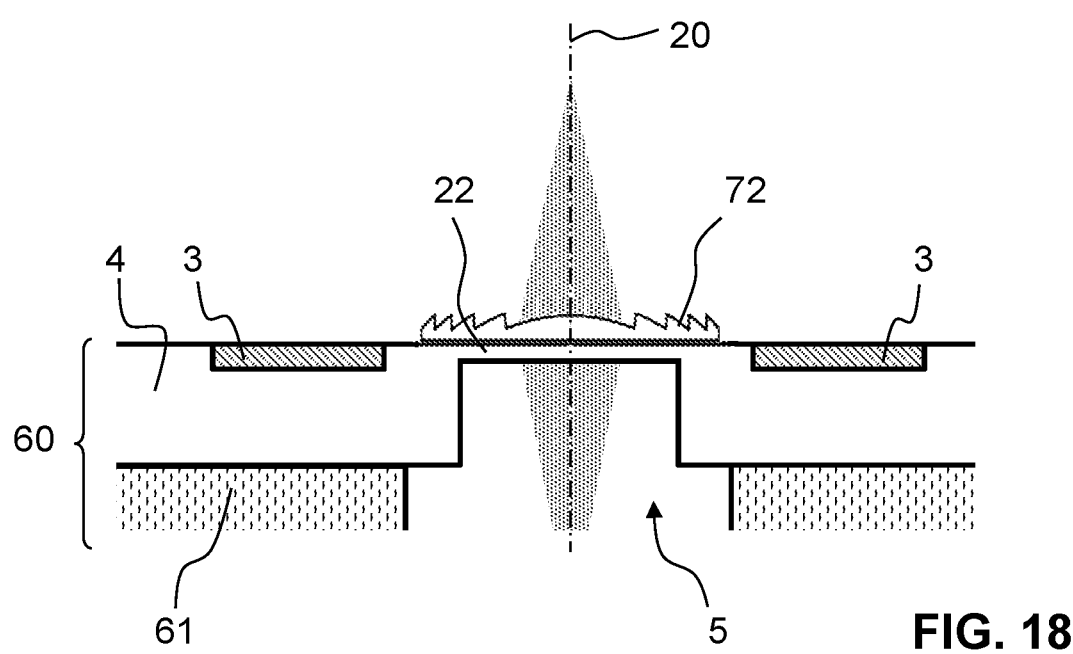
Figure 19:
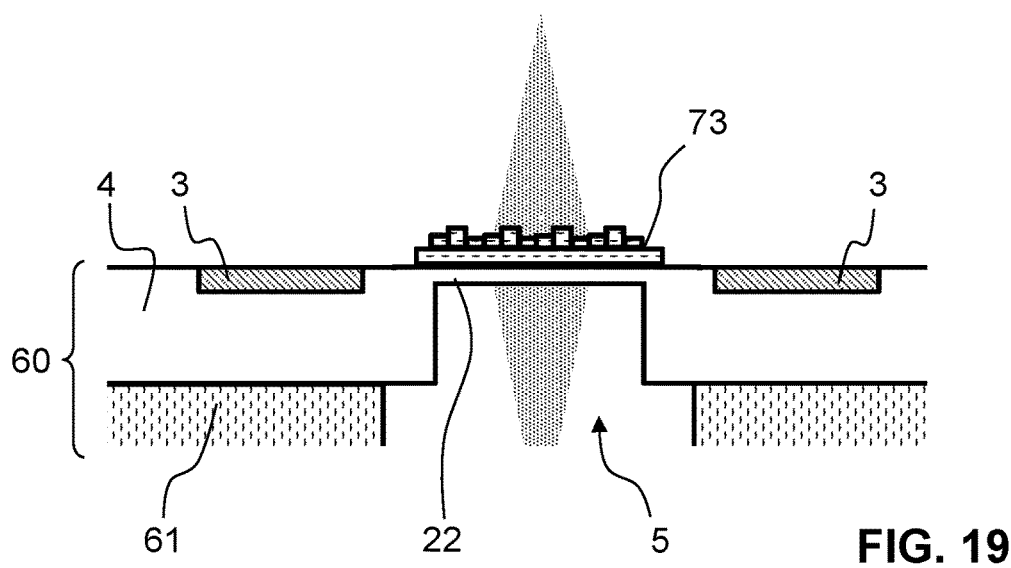

Imprint on Membrane (FIGS. 17 to 19)

An optical element can be generated by depositing a structure that acts as a refractive optical element (ROE) or a diffractive optical element (DOE) directly on a membrane formed by one or more layers of the CMOS layer stack. Examples are illustrated in FIGS. 17 to 19.

A membrane 22 is typically created by creating a CMOS layer stack on a silicon wafer and subsequently etching the wafer from the back side to create the cavity 5. An etch stop may formed by the bottommost oxide layer in the layer stack. Further thinning of the membrane can be done via further etching from within the cavity and/or from the top of the CMOS layer stack. In the region of the membrane, the CMOS layer stack should preferably comprise only SiO and/or SiN layers in order to render the membrane transparent for light.

An optical structure is then created directly on the membrane 22 by a waferlevel optics process. A waferlevel optics process that is applied directly to the wafer from which semiconductor chip 4 is formed has several advantages: The manufacturing tolerances will be reduced because the optical element is created by a waferlevel process. The optical element can be brought closer to the photodetector plane, in which the photodetectors are arranged. Shadowing due to the optical element is minimized, thereby increasing the measurement volume. Flow above the sensor will become more laminar. Measurement accuracy is generally better in laminar flow. In addition, the sensor will be less prone to accumulation of dirt and may thus achieve an increased lifetime. The design is natively fluid tight at the first end of the cavity and thus particularly well-suited for applications like wearables, where some level of water resistance is required.

In the embodiment of FIG. 17, a polymer lens 71 is created directly on the membrane 22 by waferlevel imprinting. As illustrated in FIGS. 18 and 19, it is also possible to imprint a Fresnel lens 72 (FIG. 18) or a diffractive optical element (DOE) pattern 73 (FIG. 19) for even flatter device topography.

It is also possible to create an ROE or DOE pattern on the membrane 22 by related waferlevel technologies like nanoimprint lithography or greyscale lithography. In greyscale lithography, a photoresist is applied to the wafer surface in a spin coating process. Standard photolithography equipment is used in conjunction with a greyscale mask to partially cure the photo resist. The uncured resist is removed, leaving the shape of the optical element remaining on the wafer. Greyscale lithography can also be done using direct laser writing, where the greyscale curing intensities are modulated by changing the laser power while scanning the photoresist surface on the wafer.

In all these techniques, the optical polymer or photoresist should not cover the photodetectors 3 or the pads for wirebonding on the semiconductor chip 4. This can be achieved by selectively UV curing the optical polymer or photoresist through a partially transparent stamp. The uncured and still liquid polymer can be removed from the surface of the semiconductor chip 4 after creating the optical elements.

Figure 20:
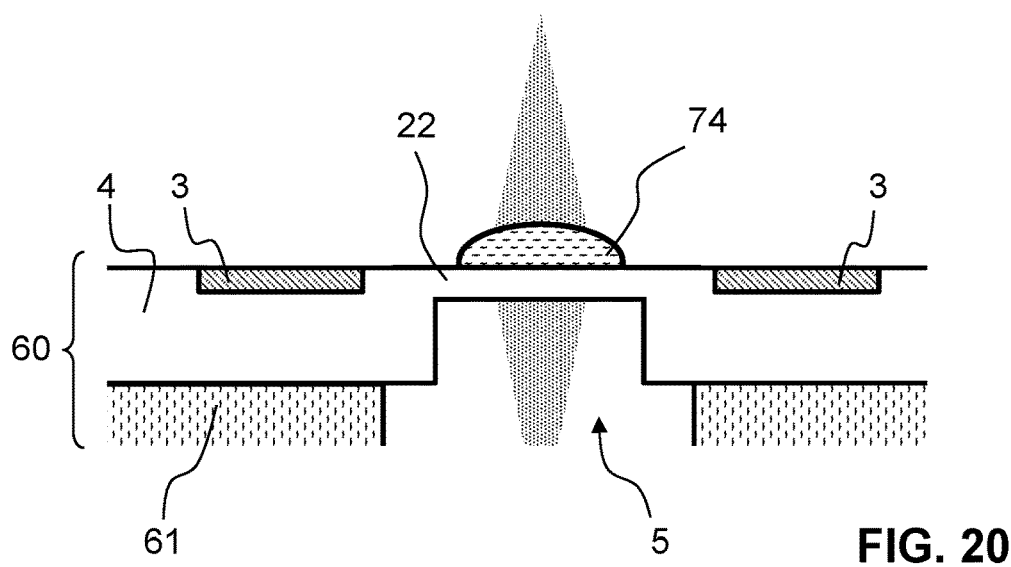

Dispensed or Droplet Microlens (FIG. 20)

In some embodiments, the optical element can comprise a dispensed or droplet microlens 74, as illustrated in FIG. 20. A dispensed or droplet microlens acquires its shape by the action of phenomena like surface tension, wetting or anti-wetting, and gravity. The shape of a dispensed or droplet microlens is determined by several factors, including membrane surface energy, droplet volume, structuring of the membrane surface and droplet surface tension. These parameters can be varied to some extent to influence the optical properties of the microlens. For instance, the membrane surface energy can be changed via a plasma process. The droplet surface tension can be changed by choosing a different lens material.

Droplet lenses can also be obtained using a melted photoresist process. In this process, a polymer pillar is created on top of the membrane using (binary) photolithography. The polymer is subsequently melted using a reflow process.

Optical Element on Bottom Side of Membrane

Figure 21:
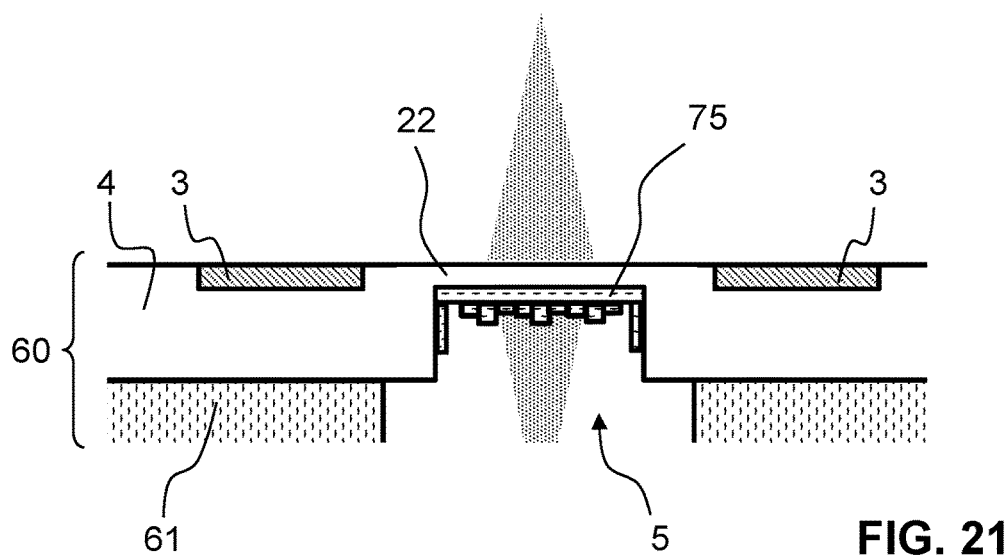

As illustrated in FIG. 21, it is also possible to dispose an optical structure 75 on the bottom side of a membrane 22, facing the cavity 5. The same techniques as described above can be used for creating the optical structure. To this end, the wafer may be flipped such that the cavity is open towards the top, and the optical structure can be created by imprinting and UV curing or by photolithography from above. The side walls of the cavity act as native flow stops for the polymer or photoresist. In an alternative process, the wafer is not flipped, and the optical structure is created from below by a process in which a stamp is filled with the optical polymer and the wafer is pushed down onto the stamp from above.

Figure 22:
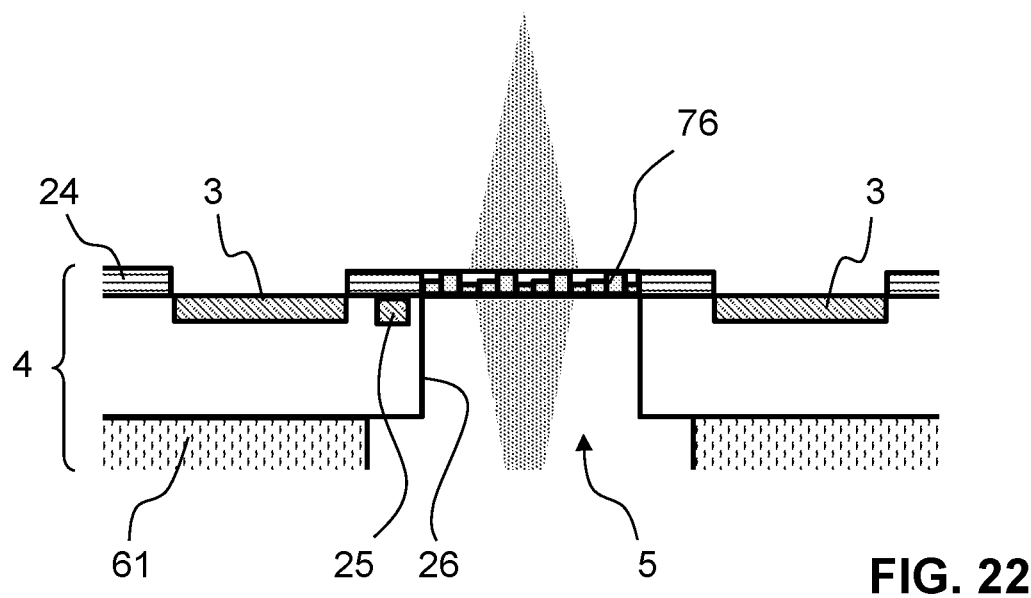

DOE in Membrane (FIG. 22)

FIG. 22 shows an embodiment in which an optical structure 76 is created directly inside a CMOS membrane, i.e., inside a membrane that is formed by layers of a CMOS layer stack 24. This can be achieved by fabricating the optical structure 76 using the CMOS process or by subsequent waferlevel processes applied to the top or bottom of the CMOS membrane. In this manner, manufacturing tolerances can be further reduced, and costs can also be reduced. The flow above the sensor will be even more laminar, further reducing the accumulation of dirt on the optical element. Again, such a design is natively fluid-tight at the first end of the cavity.

If the membrane has been structured in this manner, the membrane material may be considered to have been transformed into a metamaterial, i.e., a material that has been structured to have a property that is not found in the material before it has been structured.

Methods for fabricating DOEs using the CMOS process are disclosed in the following publication: Dai, Ching-Liang & Chen, Hunglin & Lee, Chi-Yuan & Chang, Pei-Zen, "Fabrication of diffractive optical elements using the CMOS process", Journal of Micromechanics and Microengineering. 12(1):22 (2001), DOI: 10.1088/0960-1317/12/1/304.

Another possible fabrication method is as follows: An optical structure can be created by imprinting a photoresist or by photolithography on the wafer. Subsequently, an etching process may be applied, which removes the photoresist while transferring the optical structure of the photoresist into the membrane topography. This can be done from either side of the membrane.

In these embodiments, stray light for monitoring the optical power of the light source 1 can reach the auxiliary detector 25 directly through the CMOS layers of the membrane. Therefore, an opaque coating may be safely applied to the side walls 26 of the cavity 5.

Figure 23:
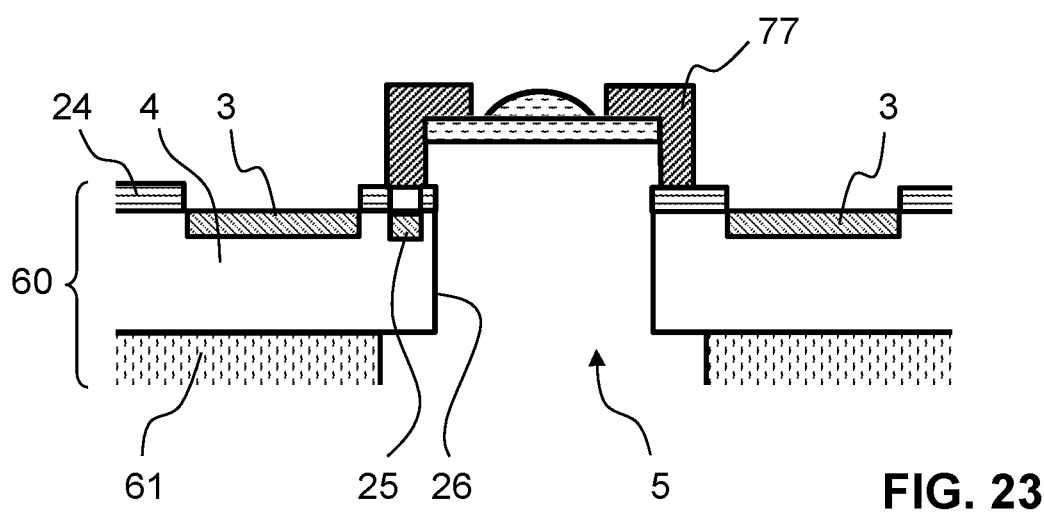

2K Mold Lens (FIG. 23)

FIG. 23 shows an embodiment wherein the optical element is a 2K mold lens 77. A 2K mold lens comprises an injection-molded lens frame in which the lens itself is replicated by dispensing the lens material into a replication mold and UV curing.

While the embodiments of FIGS. 17 to 23 are illustrated with a spacer 61, the spacer can also be left away. An opaque layer can be applied to the cavity side walls, as explained in conjunction with FIG. 15, to reduce stray light at the photodetectors.

Figure 24:
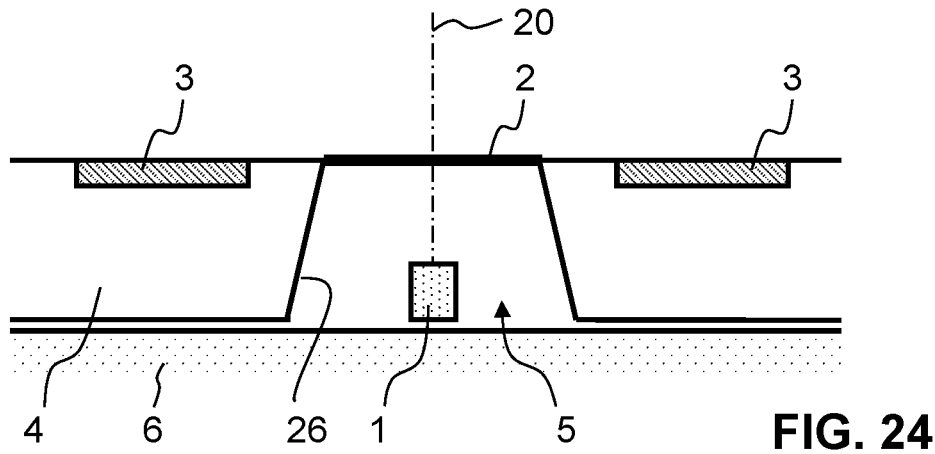
Figure 25:
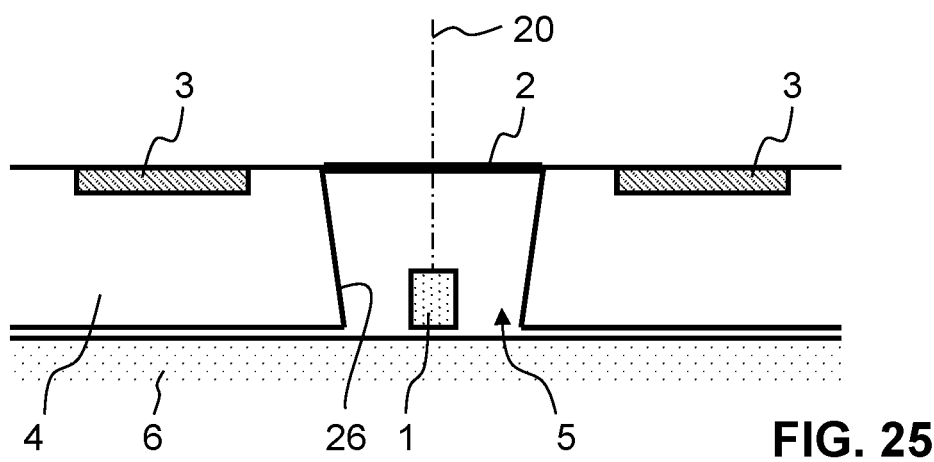
Figure 26:
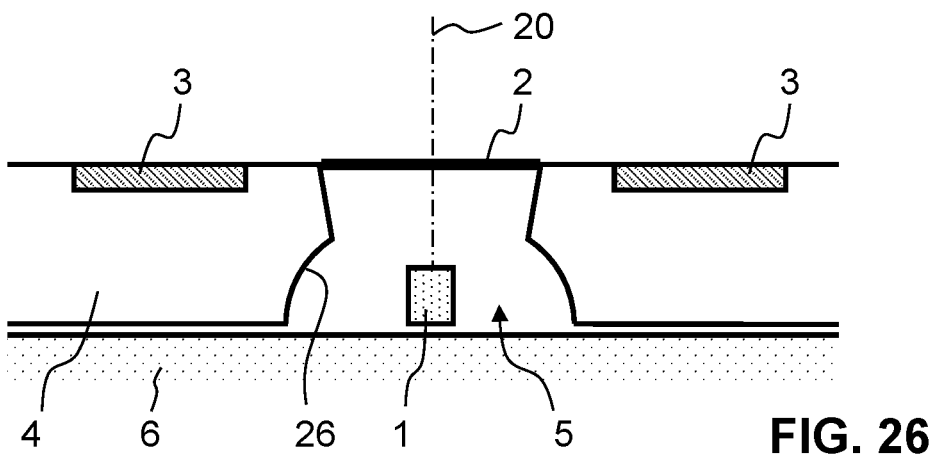

Shapes of Side Walls of Cavity (FIGS. 24 to 26)

FIGS. 24 to 26 illustrate some examples of possible shapes of the cavity side walls 26. In FIG. 24, the side walls 26 are inclined towards the bottom, i.e., the lateral dimensions of the cavity 5 increase towards the bottom. Such an embodiment is particularly advantageous if an opaque coating is to be applied to the cavity side walls 26. In FIG. 25, the side walls are inclined towards the top. In FIG. 26, the side walls have a top portion that is inclined towards the top and a bottom portion that is opens up towards the bottom in a convex shape. The different shapes can be readily created by appropriate etching methods, as it is well known in the art.

In all these embodiments, the cavity 5 has a symmetry axis that is perpendicular to the photodetector plane. For instance, in the case of a cavity with square cross section, the cavity may have fourfold rotational symmetry about the symmetry axis. In the case of a cavity with circular cross section, the cavity may be cylindrically symmetric. Preferably, the symmetry axis coincides with the optical axis 20.

Figure 27:
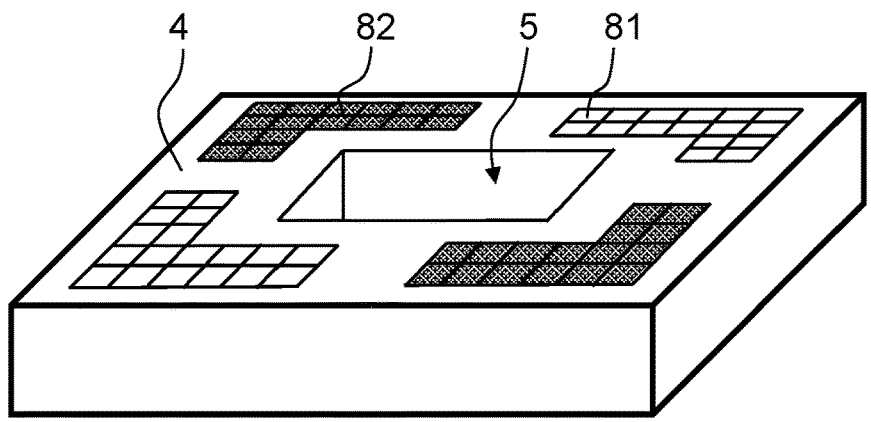
FIG. 27 shows a perspective view of a PM sensor with two partitions of photodetectors.

Partitioning the Photodetectors (FIG. 27)

FIG. 27 illustrates an embodiment in which some of the photodetectors are covered by an opaque layer, e.g., a black layer created by inkjet printing, which shields these photodetectors from light scattered by PM in the detection volume, while other photodetectors face the detection volume without being shielded. The unshielded photodetectors form a first partition 81, while the shielded photodetectors form a second partition 82. The control unit may receive signals from both shielded photodetectors and from unshielded photodetectors and apply differential processing to cancel out signals that are due to electromagnetic interference.

Figure 28:
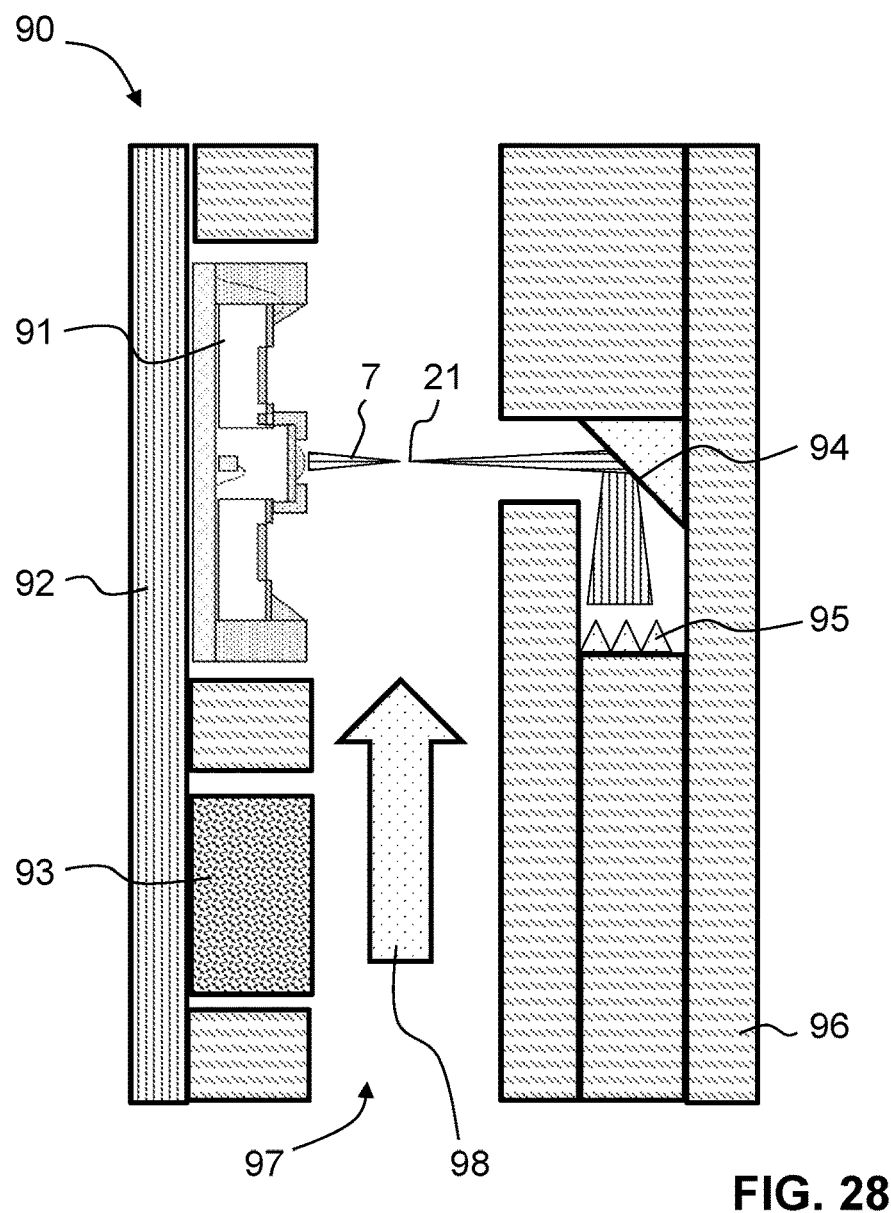
FIG. 28 shows a schematic longitudinal section through a sensor module according to a first embodiment.
Figure 29:
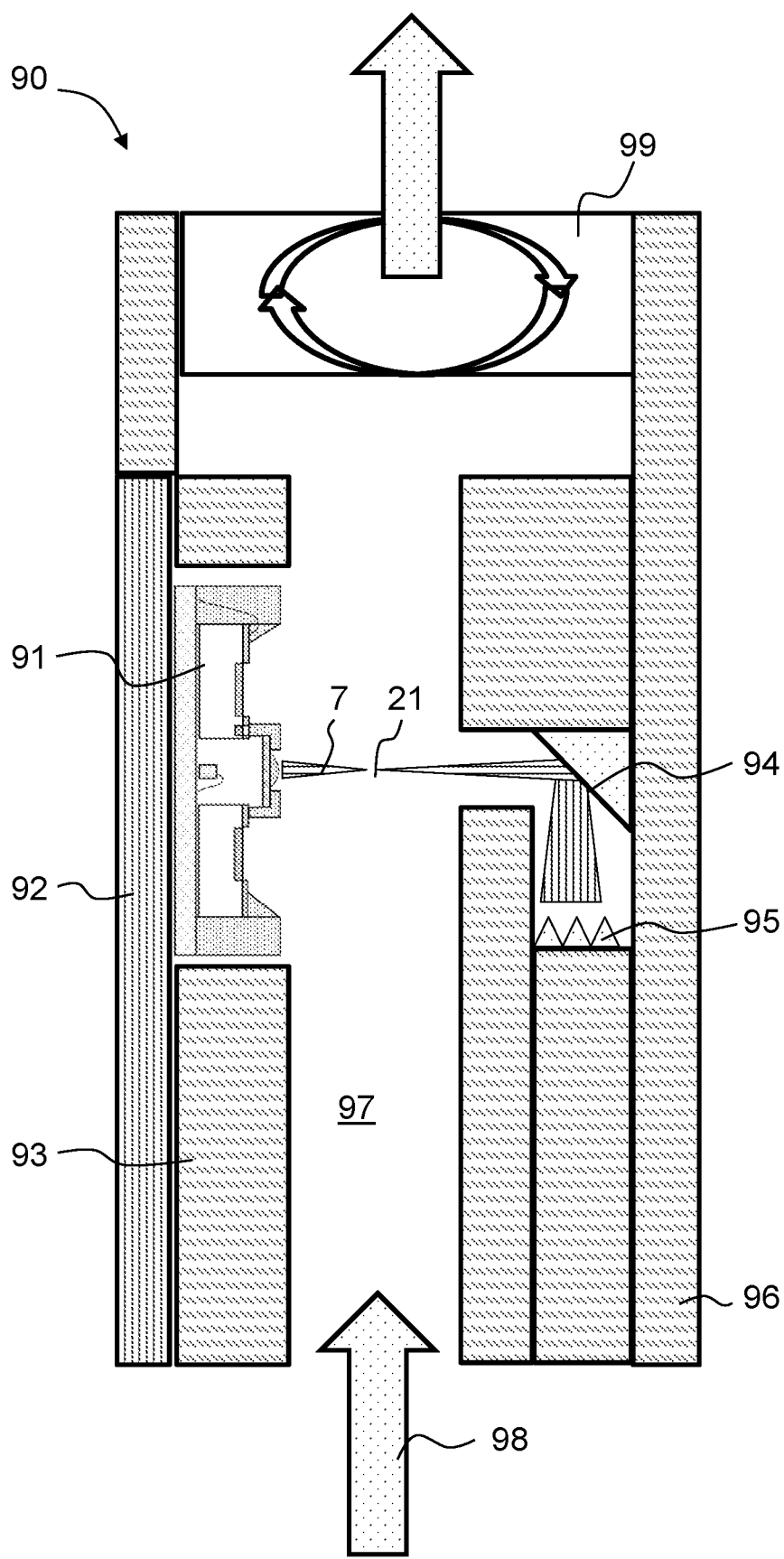
FIG. 29 shows a schematic longitudinal section through a sensor module according to a second embodiment.

Sensor Module (FIGS. 28 and 29)

FIG. 28 illustrates an embodiment of a complete PM sensor module 90. The sensor module 90 comprises a PM sensor 91 according to any one of the above-described embodiments. The PM sensor 91 is received in a housing 92, which defines a flow channel 97. A heater 93 creates a convective flow 98 in the flow channel 97. The PM sensor emits a light beam 7 into the flow channel 97. In the present embodiment, the direction of the light beam 7 is perpendicular to the direction of the convective flow 98. The light beam is deflected into a beam dump 95 by a mirror 94.

In the present example, the light beam 7 is a focused beam having a focus 21. The focus is arranged inside the flow channel 97. Thereby the detection volume is located inside the flow channel 97.

FIG. 29 illustrates another embodiment of a complete PM sensor module. In this embodiment, a heater is absent. Instead, the flow 98 is created by a fan 99.

LIST OF REFERENCE SIGNS 1 light source
2 optical element
3, 3a, 3b photodetector
4 semiconductor chip
5 cavity
6 base substrate
7 light beam
8 detection volume
9, 9' PM particle
10, 10' scattered light pulse
11 scattering particle height
12 conventional optical lens
13 diffractive optical element (DOE) on membrane
14 distance of photodetector from optical axis
15 polymer lens on glass substrate
16 support
17 optical element, e.g. glass window
18 metallization
19 light barrier
20 optical axis
21 focus
22 membrane
23 glass substrate
24 CMOS layer stack
25 auxiliary detector/photodiode
26 wall of cavity
27 control unit
28 optical filter
29 chromium coating
30 aperture
31 wire bond
32 enclosure
41 asymmetric extension
51 metallization
52 inkjet coating
53 inkjet flowstop
60 substrate
61 spacer
71 waferlevel polymer imprint lens directly on membrane
72 waferlevel polymer imprint Fresnel lens directly on membrane
73 waferlevel polymer imprint pattern directly on membrane
74 waferlevel droplet microlens directly on membrane
75 waferlevel polymer imprint pattern on bottom side of membrane
76 diffractive optical element (DOE) inside membrane
77 2K mold lens
81 first partition
82 second partition
90 PM sensor module
91 PM sensor
92 PCB
93 heater
94 mirror
95 beam dump
96 housing
97 flow channel
98 flow
99 fan

The invention claimed is:

1. A particulate matter sensor comprising:
a substrate comprising a semiconductor chip, wherein the substrate forms a cavity at least partially within the semiconductor chip;
at least one photodetector integrated at least partially within a surface of the semiconductor chip; and
a light source arranged in the cavity, the light source adapted to emit a light beam towards a first end of the cavity to define a detection volume for particulate matter outside the cavity if the light source is turned on,
wherein the surface of the semiconductor chip faces the detection volume, and
wherein the at least one photodetector is adapted to detect light scattered by particulate matter in the detection volume.

2. The particulate matter sensor of claim 1,
wherein the semiconductor chip comprises a complementary metal oxide semiconductor (CMOS) layer stack, and
wherein one or more layers of the CMOS layer stack form a membrane that spans the cavity at its first end.

3. The particulate matter sensor of claim 1, further comprising: an optical element arranged at the first end of the cavity, the optical element configured to shape the light beam to form the detection volume.

4. The particulate matter sensor of claim 3, wherein the optical element is to focus the light beam.

5. The particulate matter sensor of claim 3,
wherein the optical element is arranged in a plane defined by the surface of the semiconductor chip, or wherein the optical element protrudes by 1 mm or less from the surface of the semiconductor chip.

6. The particulate matter sensor of claim 3, wherein the at least one photodetector is arranged laterally adjacent to the optical element.

7. The particulate matter sensor of claim 3, wherein the optical element forms a refractive optical element and/or a diffractive optical element.

8. The particulate matter sensor of claim 3, wherein the optical element comprises a glass carrier substrate and an optical structure formed on the glass carrier substrate.

9. The particulate matter sensor of claim 3,
wherein the semiconductor chip comprises a CMOS layer stack,
wherein the optical element comprises a membrane formed by one or more layers of the CMOS layer stack, and
wherein an optical structure is disposed on the membrane to form the optical element together with the membrane.

10. The particulate matter sensor of claim 3,
wherein the semiconductor chip comprises a CMOS layer stack,
wherein the optical element comprises a membrane formed by one or more layers of the CMOS layer stack, and
wherein the membrane comprises at least one structured CMOS layer to form the optical element.

11. The particulate matter sensor of claim 3, further comprising a diaphragm to define an aperture for the light beam, wherein the diaphragm is formed by a coating on the optical element.

12. The particulate matter sensor of claim 3, wherein a light barrier between the optical element and the at least one photodetector comprises a blackening or silvering of side walls of the optical element facing the at least one photodetector.

13. The particulate matter sensor of claim 1, wherein the particulate matter sensor comprises a plurality of photodetectors, the plurality of photodetectors disposed at different locations around the cavity.

14. The particulate matter sensor of claim 13,
the plurality of photodetectors are integrated into the surface of the semiconductor chip, wherein the plurality of photodetectors are separated by an electrically conducting material.

15. The particulate matter sensor of claim 1, further comprising:
a control unit electrically coupled to the at least one photodetector and adapted to receive signals from the at least one photodetector caused by light scattered by particulate matter in the detection volume and to determine a physical quantity related to the particulate matter based on the signals, and
wherein at least part of the control unit is integrated into the semiconductor chip.

16. The particulate matter sensor of claim 15, further comprising: a photosensitive auxiliary detector, the photosensitive auxiliary detector integrated into the semiconductor chip to receive light that has been emitted from the light source and has not been scattered by particulate matter in the detection volume,
wherein the control unit is coupled to the photosensitive auxiliary detector and is configured to determine an optical power of the light source based on signals of the photosensitive auxiliary detector, and wherein the control unit is configured to determine the physical quantity related to the particulate matter or to control the light source based, at least in part, on the optical power.

17. The particulate matter sensor of claim 16,
wherein the particulate matter sensor comprises an optical element arranged at the first end of the cavity, the optical element configured to adjust the light beam that is to form the detection volume, and
wherein the photosensitive auxiliary detector is arranged adjacent to the optical element and is adapted to measure stray light from the optical element.

18. The particulate matter sensor of claim 15,
wherein the particulate matter sensor comprises a plurality of photodetectors,
wherein the plurality of photodetectors are partitioned into a first partition facing the detection volume and a second partition shielded from light scattered by particulate matter in the detection volume, and
wherein the control unit is to perform a differential measurement of the first partition and the second partition, thereby cancelling spurious effects of electromagnetic interference with the at least one photodetector.

19. The particulate matter sensor of claim 1, comprising:
a plurality of photodetectors that are integrated in the surface of the semiconductor chip; and
a light-blocking element, the light-blocking element arranged above the surface of the semiconductor chip in such a manner that the light-blocking element selectively shields a portion of at least one photodetector of the plurality of photodetectors from light that has been scattered from a particulate matter particle in the detection volume, the portion depending on a distance of the particulate matter particle from the surface of the semiconductor chip while at least one other photodetector is not shielded by the light-blocking element.

20. The particulate matter sensor of claim 19, further comprising: a control unit electrically coupled to the plurality of photodetectors and adapted to receive signals from the at least one photodetector caused by light scattered by particulate matter in the detection volume and to determine a physical quantity related to the particulate matter based on the signals,
wherein the control unit is to determine a distance of the particulate matter particle from the surface of the semiconductor chip by comparing signals from the at least one photodetector that is partially shielded by the light-blocking element to signals from the at least one photodetector that is not shielded by the light-blocking element, and
wherein the control unit is to determine the physical quantity related to the particulate matter based, at least in part, on the distance.

21. The particulate matter sensor of claim 1,
wherein the substrate comprises a spacer, wherein the semiconductor chip is bonded to the spacer, and
wherein the cavity is formed in both the spacer and the semiconductor chip.

22. The particulate matter sensor of claim 1, comprising a base substrate, wherein the light source is mounted on the base substrate,
wherein the substrate is arranged on the base substrate, the cavity at a second end opens towards the base substrate, and
wherein the base substrate extends in a plane that is parallel to the surface of the semiconductor chip.

23. The particulate matter sensor of claim 1, wherein the cavity is laterally delimited by side walls, the side walls formed by the substrate, wherein at least a portion of the side walls is formed by the semiconductor chip.

24. The particulate matter sensor of claim 1, wherein the cavity has a symmetry axis, wherein the cavity has a rotational symmetry about the symmetry axis, and wherein the symmetry axis is perpendicular to the surface of the semiconductor chip.

25. The particulate matter sensor of claim 1, further comprising:

an opaque coating, the opaque coating covering at least one side wall of the cavity to prevent light from the light source from reaching the at least one photodetector through the at least one side wall.

26. The particulate matter sensor of claim 25, wherein the opaque coating comprises a metallization and/or a coating that has been applied by an inkjet process.

27. The particulate matter sensor of claim 1, wherein an optical filter is disposed on the surface of the semiconductor chip, the optical filter covering the at least one photodetector, the optical filter configured to reject light having wavelengths outside a wavelength band that contains a dominant wavelength of the light source.

28. The particulate matter sensor of claim 1, wherein the cavity is an etched cavity.

29. A device comprising:
a substrate comprising a semiconductor material, the substrate forming a cavity, wherein a portion of the cavity is within the semiconductor material;
a photodetector integrated at least partially within a surface of the semiconductor material; and
a light source arranged in the cavity to emit a light beam towards an end of the cavity to define a detection volume for particulate matter outside the cavity if the light beam is activated,
wherein the surface of the semiconductor material faces the detection volume, and
wherein the photodetector is to detect light scattered by particulate matter in the detection volume.

30. A sensor comprising:
a housing;
a flow channel arranged in the housing;
a fan or a heater arranged in the housing to cause air to move through the flow channel;
a matter sensor, wherein the matter sensor includes a substrate that forms a cavity at least partially within semiconductor material, a photodetector at least partially integrated within a surface of the semiconductor material, and a light source arranged in the cavity to emit a light beam towards an end of the cavity, and
wherein the light beam is to define a detection volume for matter outside the cavity if the light beam is turned on, and wherein the matter sensor is arranged in the housing such that the flow channel includes a portion of the detection volume.

* * * * *